(12) United States Patent
Rousu et al.

(10) Patent No.: US 8,774,067 B2
(45) Date of Patent: Jul. 8, 2014

(54) ANTENNA IMPEDANCE STABILIZATION WITH STABILIZATION LOAD IN SECOND ANTENNA CIRCUITRY

(75) Inventors: Seppo O. Rousu, Oulu (FI); Marko E. Leinonen, Haukipudas (FI); Juha P. Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 1079 days.

(21) Appl. No.: 12/619,890

(22) Filed: Nov. 17, 2009

(65) Prior Publication Data

US 2011/0116423 A1    May 19, 2011

(51) Int. Cl.
H04L 5/00    (2006.01)

(52) U.S. Cl.
USPC ............... 370/297; 370/343; 455/75; 455/78; 455/161.1; 333/126; 333/129; 333/132

(58) Field of Classification Search
None
See application file for complete search history.

(56) References Cited

U.S. PATENT DOCUMENTS

| | | | |
|---|---|---|---|
| 6,266,026 B1 | 7/2001 | Stengel, Jr. | |
| 7,518,469 B2 * | 4/2009 | Kemmochi et al. | 333/126 |
| 2007/0085754 A1 | 4/2007 | Ella et al. | 343/862 |
| 2009/0021325 A1 | 1/2009 | Lee et al. | |

FOREIGN PATENT DOCUMENTS

| | | |
|---|---|---|
| EP | 1 271 794 A2 | 1/2003 |
| JP | 3-267803 A2 | 11/1991 |
| JP | 8-307334 A2 | 11/1996 |
| JP | 8-321716 A2 | 12/1996 |
| JP | 2008011329 A | 1/2008 |
| JP | 2008244547 A | 10/2008 |
| WO | WO-2005/039060 A2 | 4/2005 |

OTHER PUBLICATIONS

"Wide-Band Low-Loss High-Isolation Microstrip Periodic-Stub Diplexer for Multiple-Frequency Applications", Berndie Strassner et al., IEEE Transactions on Microwave Theory And Techniques, vol. 49, No. 10, Oct. 2001, p. 1818-1820.
"An Innovative Reconfigurable Reflection-Type Phase Shifter for Dual Band WLAN Applications", A. Ocera et al., IEEE, Sep. 2006, p. 64-67.
Patch Antennas partially filled with CRLH cells for Self-Diplexed Antennas for RFID Application, Eduardo Ugarte-Munoz et al., IEEE, Oct. 2008, p. 690-693.
"Hybrid of Monopole and Dipole Antennas For Concurrent 2.4 And 5-GHz WLAN Access Point", Jui-Hung Chou et al., Microwave And Optical Technology Letters, vol. 51, No. 5, May 2009, p. 1206-1209.

* cited by examiner

*Primary Examiner* — Kibrom T Hailu
(74) *Attorney, Agent, or Firm* — Harrington & Smith

(57) ABSTRACT

There are first and second antennas proximally disposed and configured to resonate within respective first and second frequency bands, which may overlap. An impedance stabilization circuitry is coupled to ground. There is a selective coupler (for example, diplexer, directional coupler, switch) interfacing the second antenna selectively with the impedance stabilization circuitry and with radio circuitry. The selective coupler comprises a first port coupled to the second antenna, a second port coupled to the impedance stabilization circuitry, and a third port configured to couple with radio circuitry that is configured to operate in the second frequency band. The selective coupler provides a predetermined impedance to signals within the first frequency band and a low insertion loss to signals within the second frequency band, thus providing a stable impedance for the first antenna's view of the second antenna.

20 Claims, 18 Drawing Sheets

ANTENNA IMPEDANCE STABILIZATION WITH STABILIZATION LOAD IN SECOND ANTENNA CIRCUITRY

TECHNICAL FIELD

The example and non-limiting embodiments of this invention relate generally to wireless communication systems, methods, devices and computer programs and, more specifically, relate to isolation between two (or more) antennas disposed within a single host device such as for example a single mobile phone.

BACKGROUND

The following acronyms are used in the description that follows:
ACLR adjacent channel leakage ratio
FE front-end
FM frequency modulation
GPS global positioning system
GSM global system for mobile communications (2G)
LTCC low temperature co-fired ceramic
LTE long term evolution of UTRAN (E-UTRAN or 3.9G)
MEMS micro electro-mechanical system
MIMO multiple input multiple output
OFDMA orthogonal frequency division multiple access
PIN P intrinsic N
RF radio frequency
RFID radio frequency identification
TIS total isotropic sensitivity
TRP total radiated power
UTRAN universal mobile telecommunications system terrestrial radio access network
WCDMA wideband code division multiple access (3G)
WLAN wireless local area network This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Increasingly, mobile radio terminals/handsets incorporate multiple radios (for example, one or more primary radios using various cellular technologies such as GSM, UTRAN, WCDMA, OFDMA; and one or more secondary radios such as WLAN, Bluetooth, GPS, RFID and broadcast FM radio receivers) that operate over different protocols and different frequency bands. Each of these radios must operate with an antenna tuned to the requisite frequency band though sometimes an antenna may operate in two or more radio frequency bands. And for hand-held devices such as mobile stations, all this hardware of course must be tightly arranged in a small package with attention to preventing interference between them.

A problem with a multiple antenna system is that a radiated signal of a first antenna is coupled to a second antenna and thus a radiated performance of the first antenna is decreased.

The radiated performance of the first antenna is altered in different use cases due to a change of a complex antenna isolation between antennas. Such use cases are for example whether the mobile terminal is resting on a table, in the user's hand, and/or touching the user's cheek.

SUMMARY

In a first example embodiment of the invention there is provided an apparatus comprising: a first and a second antenna, impedance stabilization circuitry, and a selective coupler. The first antenna is configured to resonate within a first frequency band. The second antenna is disposed proximal to the first antenna and configured to resonate in a second frequency band. The selective coupler is configured to couple the second antenna selectively with the impedance stabilization circuitry and with radio circuitry. The selective coupler comprises a first port configured to couple to the second antenna, a second port configured to couple to the impedance stabilization circuitry, and a third port configured to couple with radio circuitry, the radio circuitry configured to operate in the second frequency band. The selective coupler is configured to provide a predetermined impedance, via the impedance stabilization circuitry, to signals within the first frequency band and to provide a low insertion loss to signals within the second frequency band.

In a second example embodiment of the invention there is provided a method comprising: determining that a first radio and first antenna that are configured to operate in a first frequency band are in an active state, and that a second radio and second antenna that are configured to operate in a second frequency band are in an active or an inactive state. The method further comprises, based on the determined active state of the first radio and first antenna and the determined active or inactive state of the second radio and second antenna, controlling an adjustable impedance of a stabilization impedance circuit which is configured to couple to a frequency selective coupler that is disposed between the second antenna and the second radio.

In a third example embodiment of the invention there is provided a computer readable memory storing computer readable instructions. In this embodiment, when the instructions are executed by a processor the resulting actions comprise: determining that a first radio and first antenna that are configured to operate in a first frequency band are in an active state, and that a second radio and second antenna that are configured to operate in a second frequency band are in an active or an inactive state; and based on the determined active state of the first radio and first antenna and the determined active or inactive state of the second radio and second antenna, controlling an adjustable impedance of a stabilization impedance circuit which is configured to couple to a frequency selective coupler that is disposed between the second antenna and the second radio.

Further detail for these and other aspects of the invention are detailed below.

Figure 9:
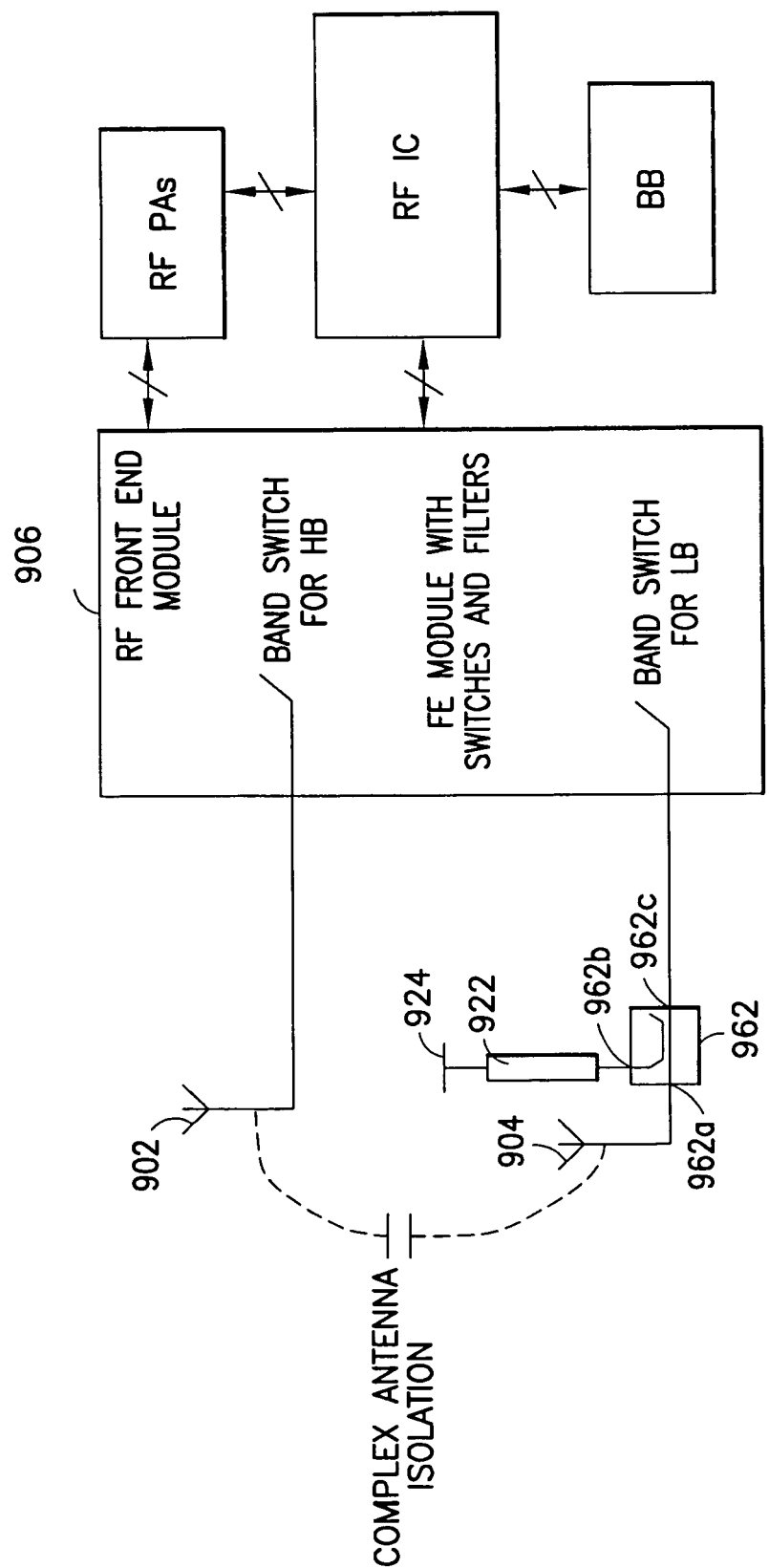
FIG. 9 is a schematic diagram similar to portions of FIG. 1 showing a seventh example embodiment of the invention in which the stabilization impedance is interfaced to the inactive antenna through a directional coupler.
Figure 10:
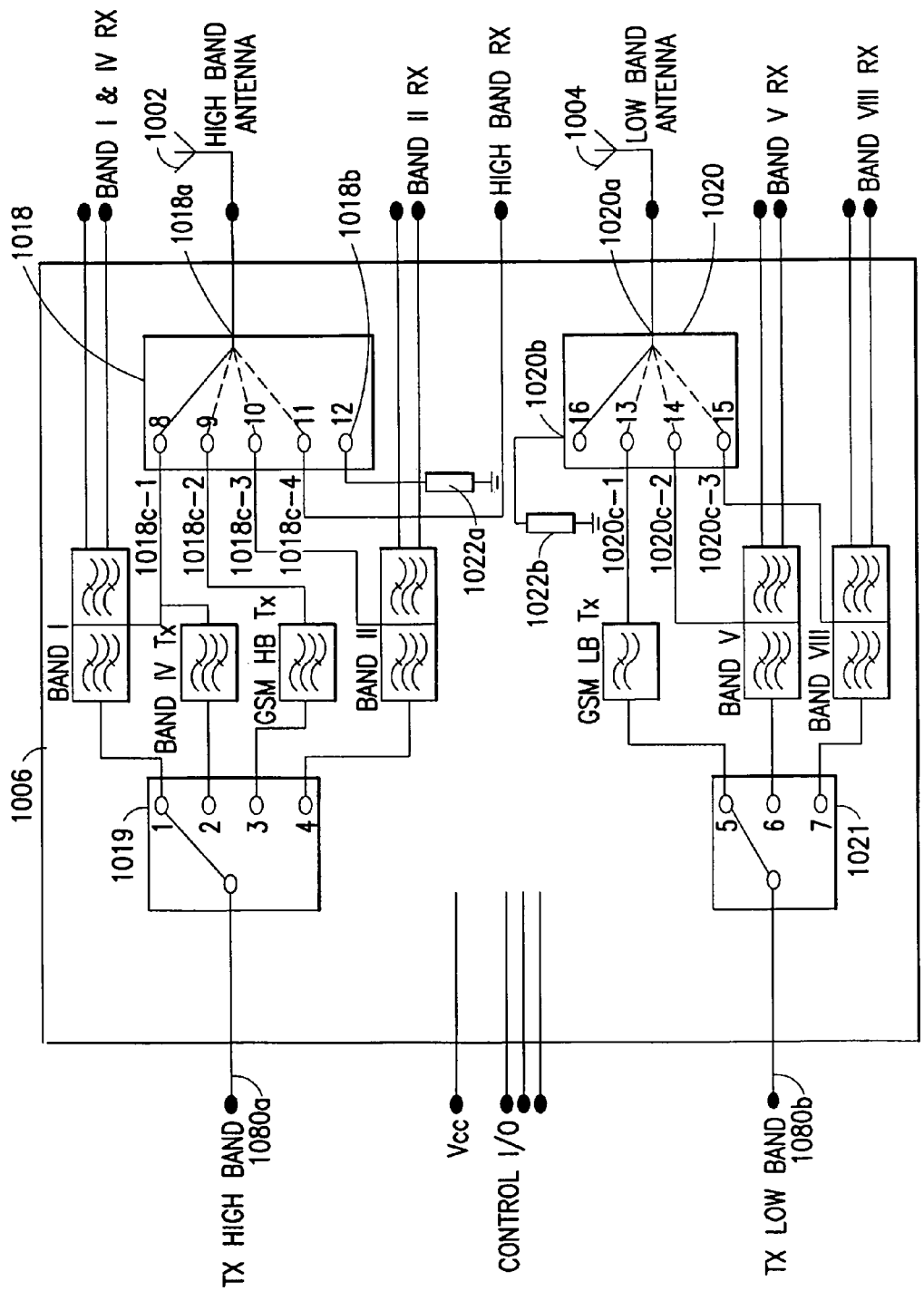
FIG. 10 is a schematic diagram showing an eighth example embodiment of the invention in which the stabilization impedance is integrated in the RF front end module and is actively switched to couple to the inactive antenna.
Figure 11:
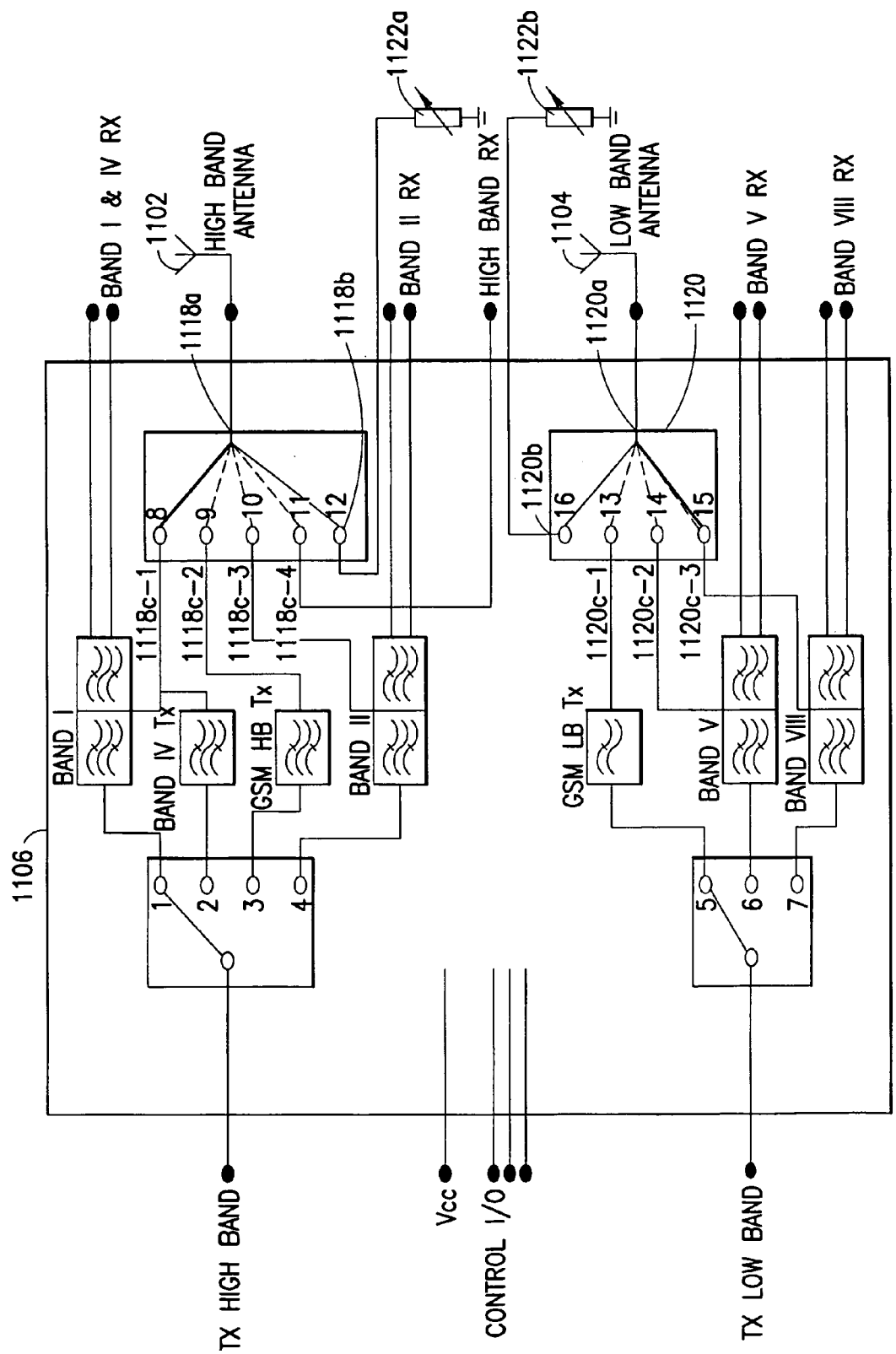
FIG. 11 is a schematic diagram similar to FIG. 10 showing a ninth example embodiment of the invention in which the impedance stabilization circuitry is located off the RF front end module.
Figure 12:
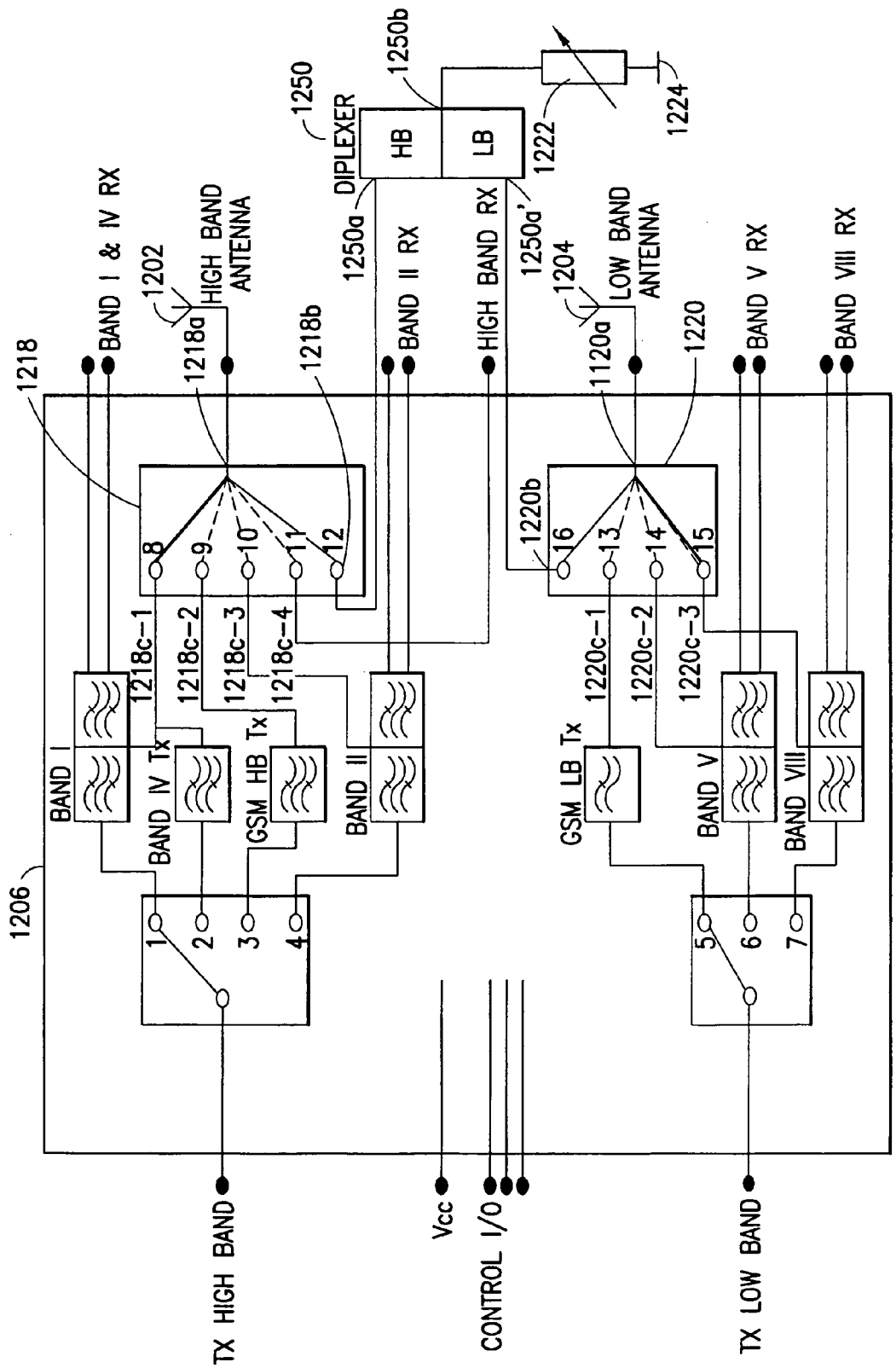
FIG. 12 is a schematic diagram similar to FIG. 10 showing a tenth example embodiment of the invention in which the stabilization impedance is tunable and interfaced to either antenna via one of two switches and a diplexer.

DETAILED DESCRIPTION:

Exemplary embodiments of the invention include a first and a second antenna, impedance stabilization circuitry, and a selective coupler. The first antenna is configured to resonate within a first frequency band. The second antenna is disposed proximal to the first antenna and configured to resonate in a second frequency band different from the first frequency band, which may overlap the first frequency band or in another embodiment the first and second frequency bands do not overlap. The impedance stabilization circuitry is coupled to ground. The radio circuitry is configured to operate in the second frequency band and the selective coupler interfaces the second antenna selectively with the impedance stabilization circuitry and with radio circuitry which is configured to operate in the second frequency band (either or both of transmit or receive). In most of the example embodiments detailed below the selective coupler is a diplexer, but FIG. 9 illustrates by further example that it may also be a directional coupler or a capacitive coupling, and FIGS. 10-12 show the selective coupler implemented as switches.

Figure 1:
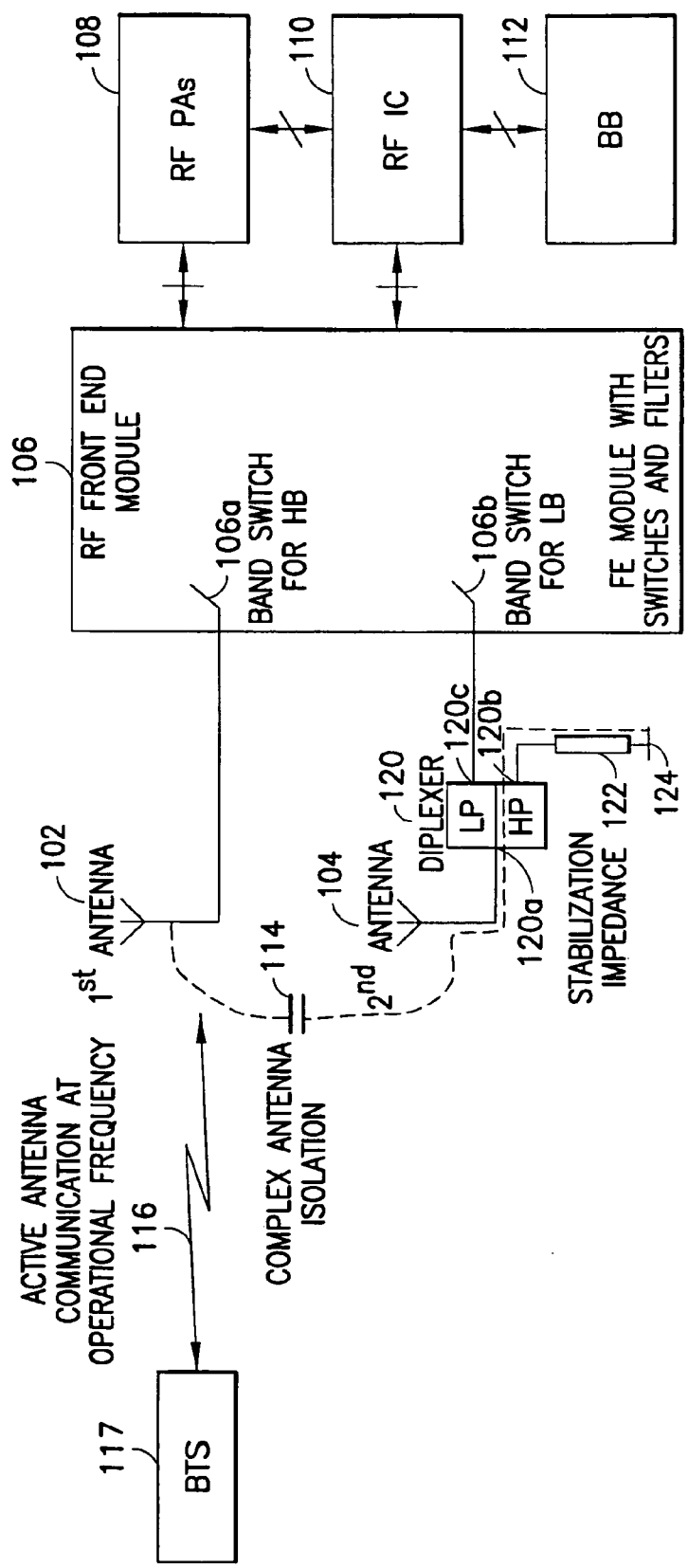
FIG. 1 is a schematic diagram illustrating a diplexer with a stabilization impedance to ground at the inactive antenna, according to an aspect of the invention.

The selective coupler has a first port which is coupled to the second antenna, a second port which is coupled to the impedance stabilization circuitry, and a third port which is configured to couple to the radio circuitry noted above which is itself operable in the second frequency band. The selective coupler is configured to provide a predetermined impedance, via the impedance stabilization circuitry, to signals within the first frequency band (for example, by porting to the second port and to the impedance stabilization circuitry signals which are in the first frequency band and which are input at the first port) and to provide a low insertion loss to signals within the second frequency band (for example, by porting signals which are input at the third port and which signals are in the second frequency band to the first port and toward the second antenna). With reference to FIG. 1 for example, the signals in the first frequency band are received at the second antenna 104 from another device or are parasitic signals received there 104 when the first antenna 102 transmits, and port through the diplexer 120 to the stabilization impedance 122 to ground. The signals in the second frequency band are from the low band switch 106b for transmission via the second antenna 104 or can also be low band signals received at the second antenna 104 which port to a receiver via the low band switch 106b. Providing an impedance implies a stabilization path, and the impedance in this case is predetermined because it is provided by the circuitry (even if dynamically controlled as in certain embodiments below). Providing a low insertion loss implies a signal path. The selective coupler may provide the predetermined impedance and the low insertion loss simultaneously or at different times as the different radios become active and inactive. Various specific and exemplary but non-limiting embodiments are presented below within the context of this overview.

Figure 2:
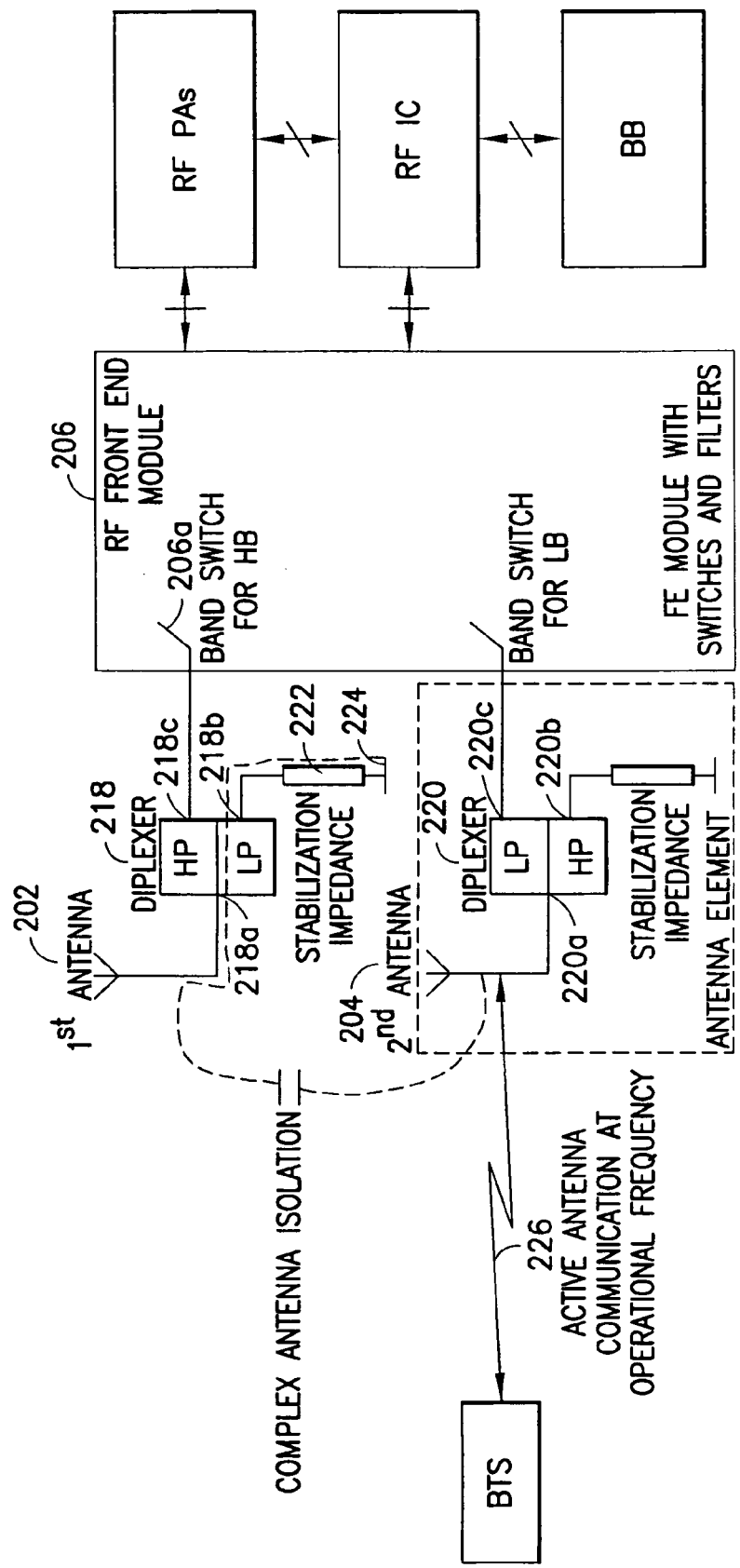
FIG. 2 is a schematic diagram illustrating two diplexers each with a stabilization impedance to ground in a mirror arrangement respecting one another's pass bands, according to another aspect of the invention.

FIGS. 1-2 illustrate by example two different aspects of the invention, from which FIGS. 3-16 are specific and exemplary embodiments of one or a combination of both aspects. While the impedance stabilization circuitry is shown there as being coupled to ground, in other exemplary embodiments it may be implemented as an open circuit piece, such as for example a microstrip or stripline without a ground coupling.

FIG. 1 illustrates a first aspect of the invention in which there is a first antenna 102 which is configured to resonate in a first frequency band, and a second antenna 104 that is proximally disposed to the first antenna 102 and which is configured to resonate in a second frequency band that is non-overlapping with the first frequency band (though in another embodiment there is some overlap between the different first and second frequency bands). Resonate can mean transmitting, receiving, or both for purposes of this description. Proximally disposed as used herein means that the two antennas are not RF isolated with respect to their resonant frequencies; they are physically spaced apart such that there is a non-negligible impedance seen by one antenna when in the active mode (for example, when actively resonating for transmitting and/or receiving signals in the first frequency band), the non-negligible impedance (seen at the active antenna) being provided by the other antenna which is in the inactive mode (for example, neither transmitting nor receiving signals in the second frequency band). In advantageous embodiments of the invention the impedance is complex, that is, it varies non-linearly.

In the example at FIG. 1, the first frequency band at which the first antenna operates is higher than the second frequency band at which the second antenna operates. There is a RF FE 106 at FIG. 1 which represents radio circuitry generally, and also shown are band switches 106a, 106b which switch in different radios and signals at different frequency bands to or from the respective antennas 102, 104. As illustrated in FIG. 1, a first band switch 106a is set to interface a high band radio to the first antenna 102, and the second band switch 106b is set to interface a low band radio to the second antenna 104, high and low bands being frequency bands relative to one another. For example, the low band may be the EGSM900 frequency band (880-960 MHz), and the high band may be the PCN/DCS1800 frequency band (1710-1880 MHz).

Also shown for context is a RF power amplifier (PA) block 108 which carries power amplifiers for transmit pathways, a RF integrated circuit (IC) block 110 which performs signal processing at RF frequencies and in some embodiments also at an intermediate frequency (IF), and there is also a baseband (BB) block 112 which performs signal processing at baseband frequencies. RF, IF and BB processing is well known in the art, and of course the direction a signal passes through these blocks depends on whether it is a signal being coded and modulated for transmission or a received signal being demodulated and decoded during reception.

In various embodiments for the radios/radio circuitry, a first and second radio may be integrated together and/or with the BB block 112, or the first and second radios may be separate from one another, and as implied above either or both of the first and second radios may be transmitters, receivers, or transceivers.

For context, there is a complex antenna isolation 114 between the first 102 and the second 104 antennas. Even while the second antenna 104 is inactive, its close proximity to the first antenna 102 causes an unwanted impedance to be seen by the first antenna 102 while the first antenna is in the active mode. When the first antenna 102 is in an active mode then it is communicating with a signal 116 for example to a wireless network illustrated as a base transceiver station BTS 117. Alternatively the communication signal 116 may communicate with at least one of another mobile terminal, a router, a relay, a node of an ad-hoc network, and a local network. To stabilize this variable impedance so it may be reliably countered, there is provided a selective coupler, shown at FIG. 1 as a diplexer 120, which interfaces the second antenna 104 to ground 124 via a stabilization impedance 122. It is understood that a triplexer, quad-plexer, etc. are each special cases of a diplexer having simply additional ports and frequency band-specific pathways passing therethrough.

The diplexer 120 has three ports: a first port 120a couples to the second antenna 104; a second port 120b couples to ground 124 via the stabilization impedance 122; and a third port 120c couples to the radio circuitry (the RF FE 106 via the band switch for low band 106b as shown at FIG. 1). In various embodiments, the diplexer 120 may be integrated into the RF FE 106, it may be distinct lumped components external to the RF FE 106 as shown at FIG. 1, or it's functionality may be integrated into the antenna circuitry (for example, antenna matching components, which typically would be disposed between the diplexer 120 and the second antenna 104) or with an antenna element 104 itself.

The first antenna 102 is operating at the high frequency band and the diplexer 120 is coupled via the first port 120a to the second antenna 104 which is configured to operate (but is not currently operating) at the lower frequency band. The second port 120b of the diplexer represents the high band (high pass) branch; high band signals input to the diplexer 120 at the first port 120a pass through the diplexer to the second port 120b where they are output to the stabilization impedance 122 and ground 124. This stabilizes the impedance seen by the first antenna 102 in the direction of the second antenna 104. The third port 120c of the diplexer represents the low band (low pass) branch; low band signals input to the diplexer 120 at the first port 120a (for example, low band signals received at the second antenna 104) pass through the diplexer to the third port 120b where they are output to the radio circuitry 106 (specifically, via the low band switch 106b to the second radio which is the low band radio. For the case of transmitting low band signals, the signals travel in the opposite direction and they are input from the low band second radio circuitry to the third port 120c of the diplexer 120 and are output at the first port 120a toward the second antenna 104 for transmission. In this case the diplexer 120 provides a low insertion loss for that low band signal (whether transmit or receive signal). The low band branch operates at the operational frequency of the second radio and the second antenna 104, and the high band branch operates at the operational frequency of the first radio and the first antenna 102.

FIG. 2 expands over FIG. 1 and only differences are further detailed. If we consider the diplexer 220 of FIG. 2 which is in the position already described for FIG. 1 as being the second diplexer 220, then at FIG. 2 there is now also a first diplexer 218 interfacing the first antenna 202 to the high band radio switch 206a. Similar to the second diplexer 220, the first diplexer 218 also has a first port 218a, a second port 218b, and a third port 218c. The first port 218a couples to the first antenna 202, the second port 218b couples to ground 224 via a stabilization impedance 222, and the third port 218c interfaces the first antenna 202 to the first (high band) radio via the high band radio switch 206a.

In the example at FIG. 2, consider now that the first radio and first antenna 202 are inactive and the second radio and second antenna 204 are actively transmitting and/or receiving a signal 226 on the low frequency band. The low band (low pass) branch of the first diplexer interfaces signals that are input to the first port 218a which are at the low frequency band to ground 224 via the stabilization impedance 222 and the second port 218b. The first diplexer 218 therefore stabilizes the impedance seen by the second antenna 204 in the direction of the first antenna 202 when the second antenna 204 is active, but provides a low insertion loss to the high band signals (transmit or receive) that pass through it when the high band first radio/first antenna 202 is active. This is true whether the first and second radios and antennas are active at the same time or at different times.

When the first antenna 202 is active, the high band (high pass) branch passes signals at the high frequency band between the first antenna 202 which is coupled to the first port 218a and the first (high band) radio via the high band radio switch 206a which is coupled to the third port 218c. Regardless of whether the first antenna 202 is active or not, the low band impedance seen at the first antenna 202 and first radio, as provided by the second antenna 204, is stable due to the stabilization impedance 222 on the low band branch of the first diplexer 218.

As with the (second) diplexer 118 described above for FIG. 1, the first diplexer 218 can be integrated onto the RF FE 206, separate as shown, or integrated onto antenna matching circuitry or the antenna element itself.

Keeping in mind the context and operational principles of FIGS. 1-2, now are described with respect to FIGS. 3-16 specific exemplary but non-limiting embodiments. Commonly situated elements are detailed in the first of these multiple embodiments where such element is introduced, and that first description may be extended to the other drawings for that same commonly situated element.

Figure 3:
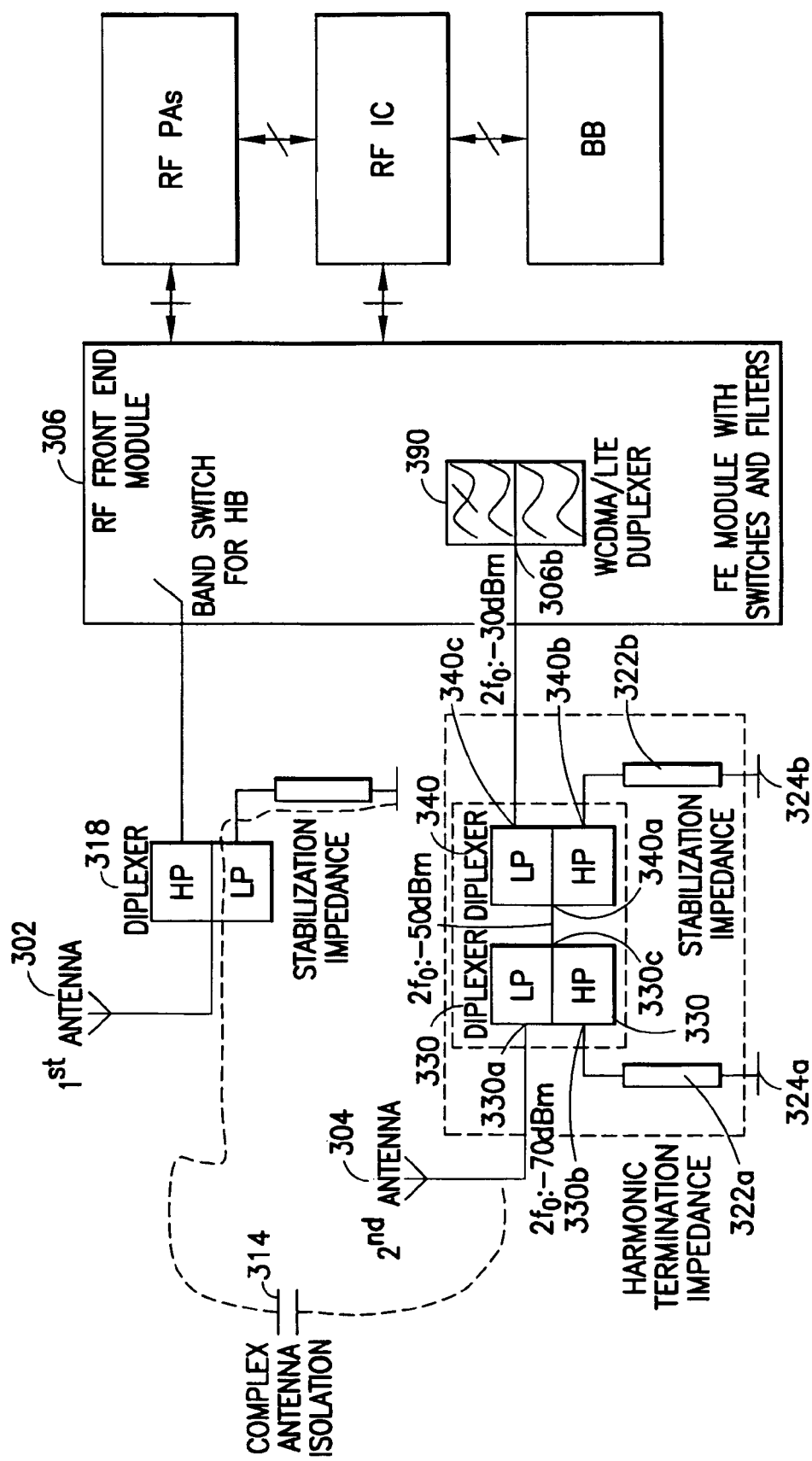
FIG. 3 is a schematic diagram similar to FIG. 2 showing a first example embodiment of the invention which uses non-reflective harmonic filtering.

A first example embodiment shown at FIG. 3 is a non-reflective harmonic filtering embodiment. As seen at the second antenna 304, there are two diplexers 330, 340, each with a stabilization impedance 322a, 322b to ground 324a, 324b in a mirror arrangement respecting one another's pass bands. Each of these two diplexers 330, 340 are in the position of the selective coupler noted in summary above, because each interfaces the second antenna 304 selectively with the impedance stabilization circuitry 322a, 322b and with radio circuitry 306 via the low band radio switch 306b. Similar to FIG. 1, there is a second diplexer 340 having a first port 340a coupled to the second antenna 304 but in this case that coupling is through the third diplexer 330. The second diplexer 340 also has a second port 340b coupled to the impedance stabilization circuitry 322b, and a third port 340c which is coupled with radio circuitry 306 via the low band radio switch 306b. The third diplexer 330 has a first port 330a coupled to the second antenna 304, a second port 330b coupled to another impedance stabilization circuitry 322a (which in this embodiment is distinct from the other impedance stabilization circuitry 322b so as to serve as a harmonic termination impedance), and a third port 330c which is coupled to the radio circuitry 306 through the second diplexer 340. In brief, the first port 340a of the second diplexer 340 is coupled to the third port 330c of the third diplexer 330. For each of those diplexers 330, 340, the third port 340c, 330c passes the low band signal and the second port 340b, 330b, passes the high band signal.

The addition of the third diplexer 330 filters harmonics of the transmission or ACLR of the low band transmit signal, provided by the low band radio, before the harmonics reach the second antenna 304 for final transmission to the ether. The high pass path at the second port 330b of the third diplexer 330 is connected to a harmonic termination impedance (HTI) 322a which absorbs harmonic transmission power. In an example embodiment, the second 340 and third 330 diplexers may be combined into one single component. Additionally, the termination and stabilization impedances 322a, 322b may be integrated to the combined diplexer component. FIG. 3 is exemplary and actual implementation of the dotted line boxes may be implemented differently than presented in FIG. 3, for example by removing redundant component(s)/block(s) which are retained at FIG. 3 for clarity of explanation.

FIG. 3 illustrates that the low frequency band radio is implemented as a WCDMA or LTE radio, which are selected via a WCDMA/LTE duplexer 390 in the RF FE 306. This specific implementation then yields harmonic levels of $2f_0=-30$ dBm at the WCDMA/LTE duplexer 390; $2f_0=-50$ dBm between the second 340 and third 330 diplexers; and $2f_0=-70$ dBm at the second antenna 304. Note that these harmonic levels are antenna load insensitive, due to the harmonic terminal impedance circuitry 322a and the third diplexer 330. This will be true for other implementations of the low band radio also; WCDMA and LTE are used only to give specific numbers for the harmonics. By the first example embodiment at FIG. 3, a change in a complex antenna isolation impedance 314 (which can equivalently be termed antenna coupling) due to an operational condition change such as beginning or ending a transmission or reception can be minimized.

Figure 4:
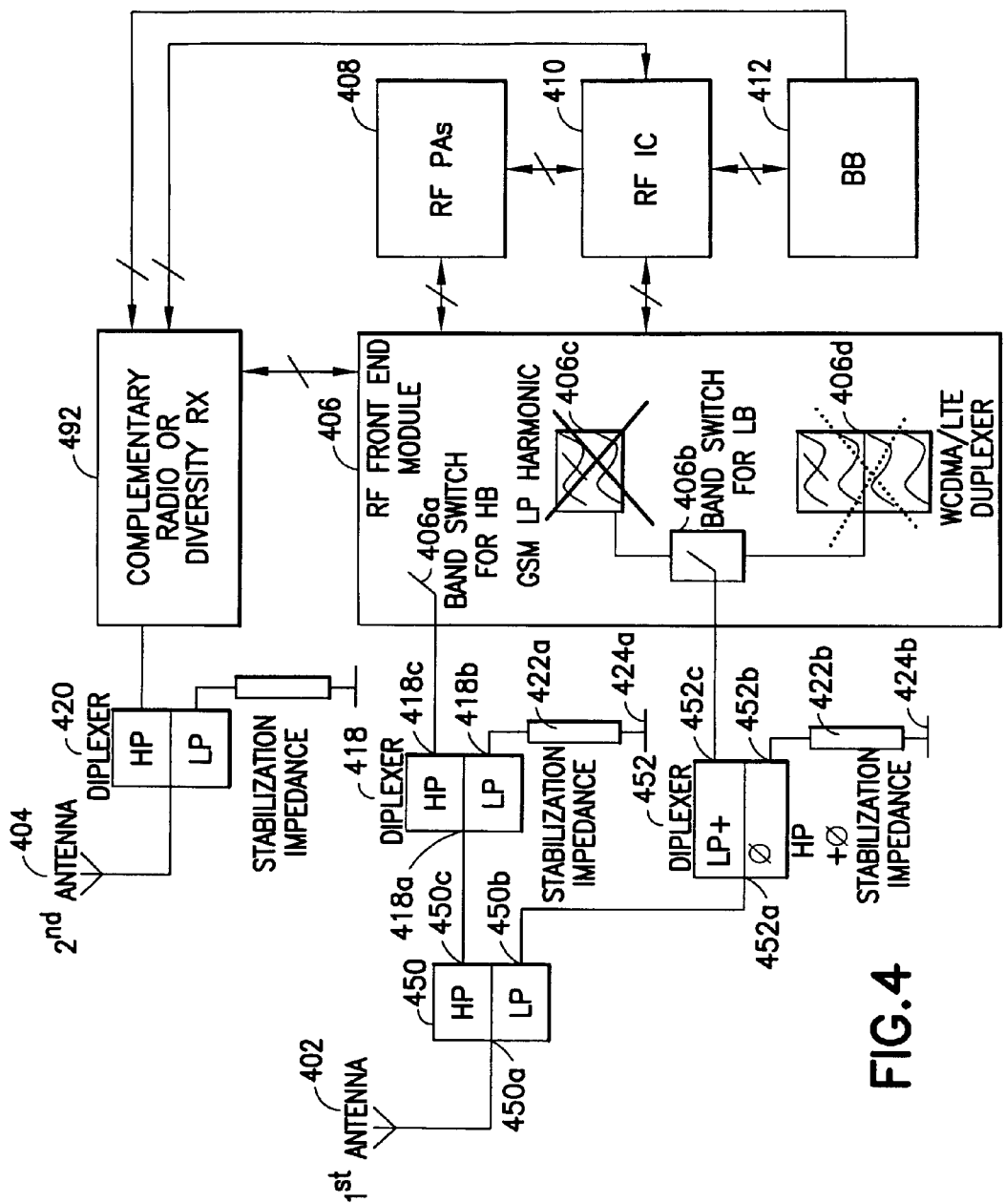
FIG. 4 is a schematic diagram combining aspects of FIGS. 1-2 and showing a second example embodiment of the invention which uses a single feed topology and also a third radio.

A second example embodiment shown at FIG. 4 is a single feed topology of the invention. The second antenna 404 in this instance is coupled via the second diplexer 420 to a radio 492 which operates at a higher frequency than the radio(s) which use the first antenna 402. By example the radio 492 may be a complementary wireless radio (CWS) for example Bluetooth or a diversity radio for example WCDMA at 850 MHz. The circuit arrangement for the second antenna 404 and second diplexer 420 is as detailed for FIG. 2, except the pass bands themselves may differ. In typical arrangements the diversity/CWS radio has its own power amplifiers and so this radio 492 interfaces with the RF integrated circuit block 410 and the baseband block 412 without using the power amplifier block 408. In some embodiments, the diversity radio 492 may operate in the same frequency band as another radio, for example the high band cellular radio interfaced by the first radio band switch 406a. In some embodiments, the diversity radio 492 may operate in a different frequency band than another radio and support multiple operational frequencies. In some embodiments 420 may include multiple coupled filtering circuitries. In some embodiments antenna 404 may support multiple operational frequencies.

The first antenna 402 is also coupled to the first port 418a of a first diplexer 418 similar also to the description for them above at FIG. 2. But in this second embodiment there is a fourth or antenna diplexer 450 disposed between the first antenna 402 and the first diplexer 418; and an additional third diplexer 452 coupled between impedance stabilization circuitry 422b and the fourth diplexer 450. Specifically, for the fourth antenna diplexer 450 the first port 450a couples to the first antenna 402 and the second port 450b on the low band branch couples to the first port 452a of the third diplexer 452 and the third port 450c on the high band branch couples to the first port 418a of the first diplexer 418. For the third diplexer 452 the first port 452a couples to the first antenna 402 via the antenna diplexer 450 and the second port 452b on the low band branch couples to the impedance stabilization circuitry 422b which is further coupled to ground 424b and the third port 452c on the high band branch couples to a low band radio switch 406b. In this case the low band radio is configured to operate at a lower band of frequencies than the high band radio that couples to the high pass branch of the first diplexer 418 via the first radio switch 406a.

The antenna diplexer 450 is used to simplify manufacture; many designs require a single feed antenna which the second embodiment supports. By example, the filtering response of the third diplexer 452 may be similar to a GSM low pass harmonic filter and thus the GSM low pass filtering 406c is redundant and can be removed from the RF front end module 406. Or in an alternative embodiment the GSM low pass filter 406c can be retained, but the filtering requirements for the third diplexer 652 can be relaxed in view of the response of the low pass filter 406c (or vice versa). In a still further alternative, there is a WCDMA/LTE duplexer 406d which will attenuate harmonics or ACLR near the GPS band low enough to guarantee correct GPS operation in most operational use cases. Additionally, the phase Ø of the third diplexer 452 may be designed for a particular fixed phase shift in order to avoid the need for an additional phase shifter (not shown), such as for example phase shifts of 30, 60, or 90 degrees. Alternatively the phase Ø of the third diplexer 452 may be tunable.

Figure 5:
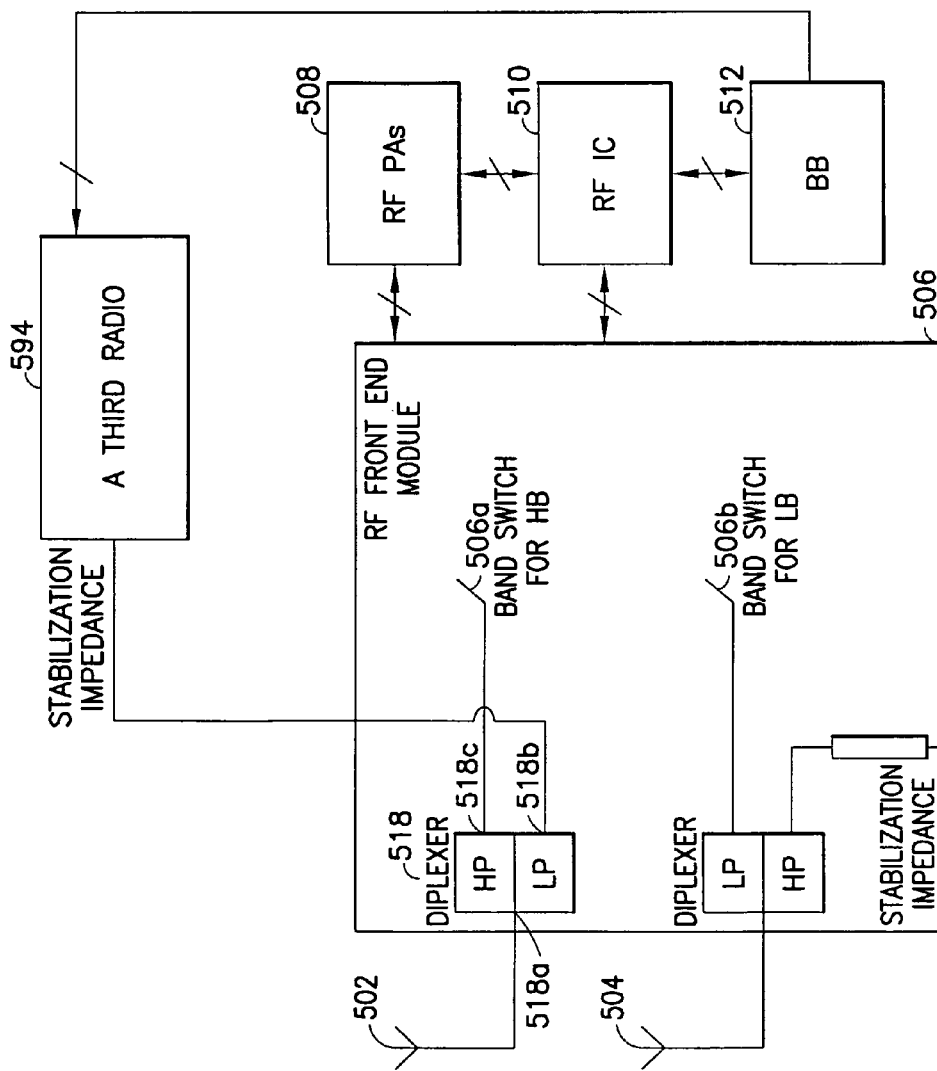
FIG. 5 is a schematic diagram similar to FIG. 2 showing a third example embodiment of the invention in which a third radio interfaces to one of the antennas.

FIG. 5 is a schematic diagram showing a third example embodiment of the invention, similar in part to FIG. 4, but in which there is a third radio 594 that interfaces to the first antenna 502 via the second port 518b of the first diplexer 518. While both the first diplexer 518 and second 520 diplexer are shown as incorporated in the RF FE module 506, note also that either or both may be separate from it.

In this third embodiment, the impedance stabilization circuitry which interfaces to the second port 518b of the first diplexer 518 is the third radio 594 itself, in that the stabilization impedance is the input impedance of the third radio 594. The value of this stabilization impedance can therefore be changed by adjusting the third radio input impedance or by operation of the third radio. Alternatively, the third radio 594 may operate as a measurement receiver/power detector for the first active radio which interfaces at the high band radio switch 506*a* and the third port 518*c*. The detected power may indicate at least one of: a power of a forward fundamental signal, a power of a reflected fundamental signal, a voltage standing wave ratio VSWR, an adjacent leakage channel ratio (ALCR) power of a forward signal, an ALCR power of a reflected signal, a power of a harmonic signal, and a power of ACLR of a harmonic signal. For example, VSWR=1 would represent a perfect match between the stabilization impedance from the third radio 594 and the impedance of the first radio coupled on the high band radio switch 506*a*.

For completeness, note that the third radio 594 may in this embodiment be coupled directly to the baseband block 512, bypassing the RF integrated circuit 510 and the power amplifier 508. At the first diplexer 518, the first port 518*a* interfaces to the first antenna 502 similar to FIG. 2.

Figure 6:
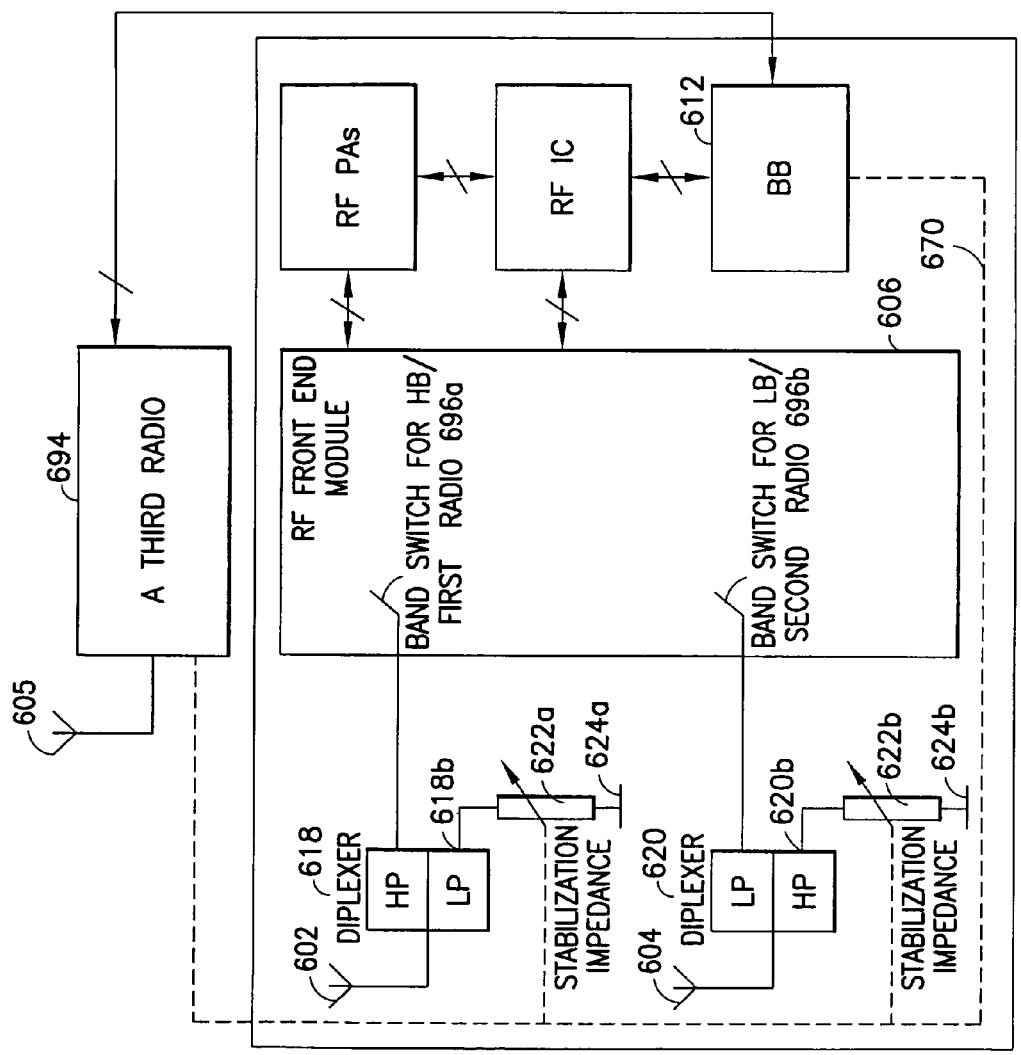
FIG. 6 is a schematic diagram similar to FIG. 5 showing a fourth example embodiment of the invention in which a third radio interfaces to one of the antennas and the stabilization impedances are tunable.

FIG. 6 is a schematic diagram of a fourth example embodiment of the invention, similar to FIG. 5 but in which the third radio 694 interfaces to a third antenna 605. The low pass second port 618*b* of the first diplexer 618 interfaces to ground 624*a* via impedance stabilization circuitry 622*a*, and similarly the high pass second port 620*b* of the second diplexer 620 interfaces to ground 624*b* via impedance stabilization circuitry 622*b*. But in this example one or both of the stabilization impedances 622*a*, 622*b* are tunable. In various example embodiments, the tunable impedance 622*a*, 622*b* may be implemented as one or more PIN-diodes, semiconductors (for example, not limited to Bipolar Junction Transistors (BJT), Field Effect Transistors (FET), and the like), MEMS capacitors, varactors, tunable/switchable groundings, and a tunable-length strip line. Combinations of any of these may also be used at the circuit designer's choice.

In operation, the stabilization impedance 622*a*, 622*b* may be controlled via control signals 670 from a first radio 696*a* (or second radio 696*b* or third radio 694) as particularly shown from the baseband block 612. In another embodiment the control signals 670 may be based on information from the first radio 696*a* and/or the second radio 696*b* in combination with information from the third radio 694. The tuning criteria as to when adjustment of the variable stabilization impedance(s) 622*a*, 622*b* is or is not executed may be based on transmission and/or reception performance of the first radio 696*a*, second radio 696*b*, and/or third radio 694.

Figure 7:
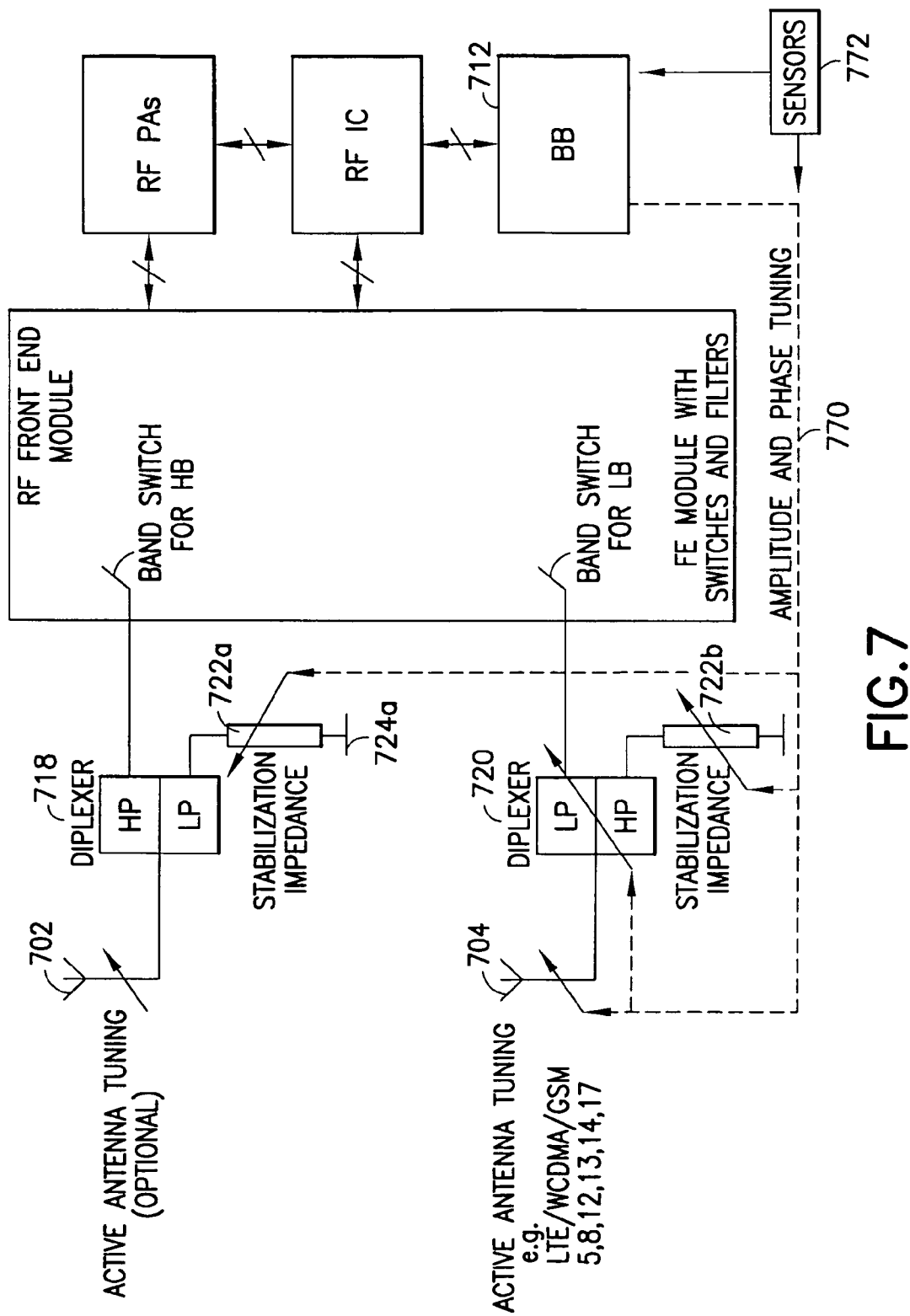
FIG. 7 is a schematic diagram similar to portions of FIG. 6 showing a fifth example embodiment of the invention in which both the stabilization impedances and the antennas are tunable.

FIG. 7 is a schematic diagram similar to portions of FIG. 6 showing a fifth example embodiment of the invention, in which the third radio is removed and both the stabilization impedances 722*a*, 722*b* and at least one of the antennas 702, 704 are tunable. When tunable antennas 702, 704 are used then a tunable diplexer 718, 720 can be used in order to adjust diplexer frequency response according to antenna resonance. The actual frequency tuning of the tunable antennas 702 and 704 may be done with a dedicated tuning circuitry.

The control signals 770 for tuning the antenna(s) 702, 704 and/or the stabilization impedance(s) 722*a*, 722*b* can be in an embodiment a combination of any two or more of the following: receive and/or transmit operational frequency, interference scenario/situation of the radios, receive and/or transmit signal levels, transmit and/or receive activities, number of sub-carriers in the signal, the modulation of the signal, a functional form of the body parts of a device (for example clam shell open/closed, slide open/closed, swivel open/closed, display open/closed), antenna being covered by an object which is detected by a sensor (for example a hand of the user covers an antenna partly or the hand of the user covers one of the antennas), antenna impedance loading condition, a power of a forward fundamental signal, a power of a reflected fundamental signal, a voltage standing wave ratio VSWR, an ALCR (adjacent leakage channel ratio) power of a forward signal, an ALCR power of a reflected signal, a power of a harmonic signal, and a power of ACLR of a harmonic signal. In a particular embodiment, there may be one or more sensors 772 which detect the operational mode of the host terminal or device and its component radios.

The tunable stabilization impedance(s) 722*a*, 722*b* may be tuned when the related diplexer 718, 720 is adjusted, or the tunable impedance(s) 722*a*, 722*b* may be tuned individually. The frequency characteristics which may be tuned in the diplexer(s) 718, 720 include one or more of stop band attenuation, pass band attenuation, and corner frequency of the diplexer. Specifically, in a particular embodiment the stop band attenuation may be done with several poles of a switch to which the second port of the diplexer 718, 720 selectively couples based on the control signals 770, in which selection of the different switch poles depends on the frequency domain and the desired/scheduled attenuation. As shown at FIG. 7, the baseband block 712 (or any other processor) can take input from the sensors 772 to generate the actual control signals 770. In an alternate embodiment the second diplexer 720 may be implemented as one or more tunable Wilkinson dividers.

Figure 8:
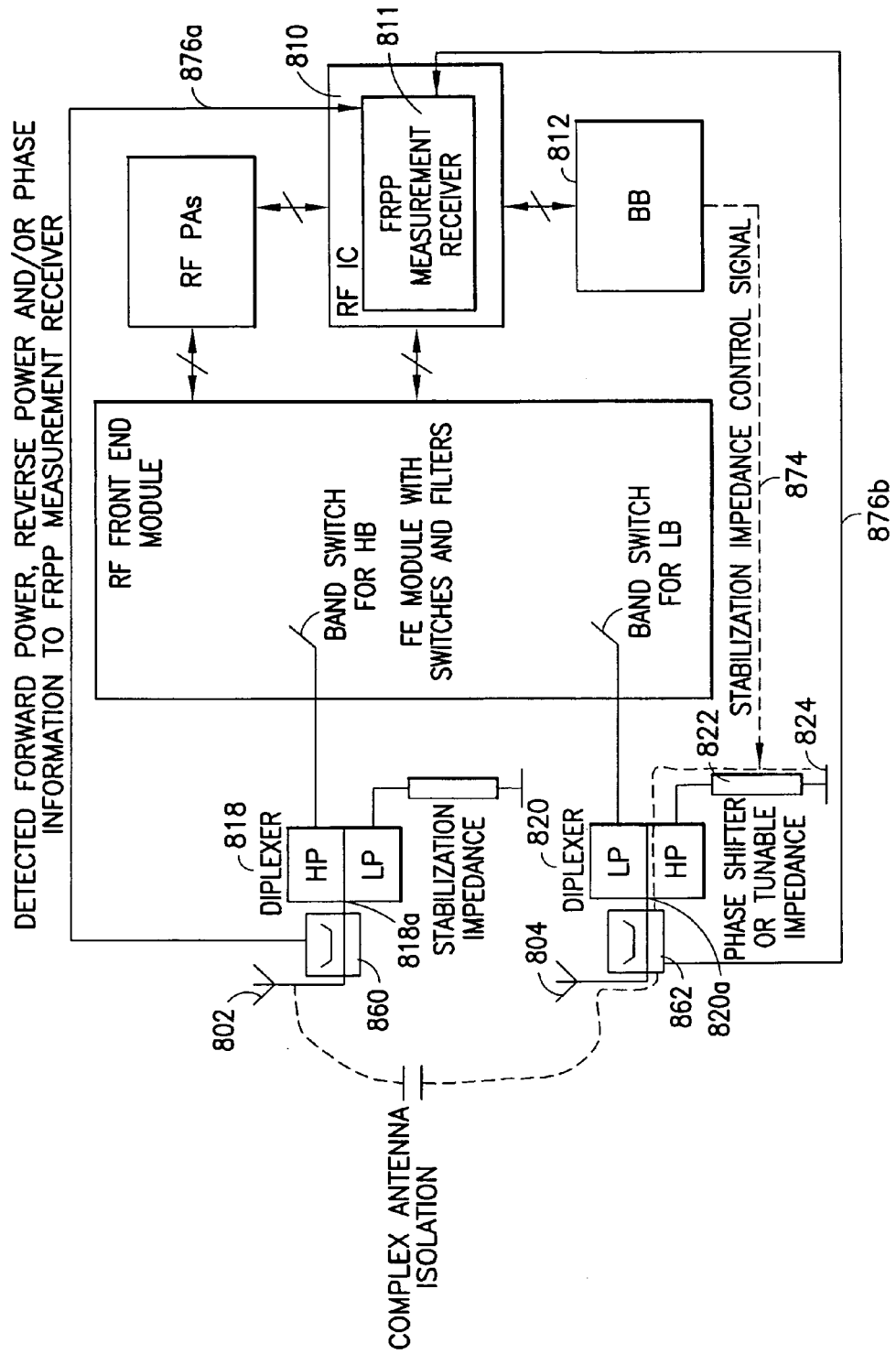
FIG. 8 is a schematic diagram similar to portions of FIG. 6 and showing a sixth example embodiment of the invention in which a stabilization impedance is tunable via a control signal.

FIG. 8 is a schematic diagram similar to portions of FIG. 6 and showing a sixth example embodiment of the invention in which a stabilization impedance 822 is also tunable, but in this embodiment there is also information of forward power, reverse power and/or phase provided to a FRPP (forward/reverse power measurement) receiver 811 which is shown by example as being incorporated in the RF integrated circuit 810. The control signal 874 for controlling the adjustable stabilization impedance 822 is shown by example as originating at the baseband block 812, similar to one of the embodiments shown at FIG. 7. The arrangement of diplexers 818, 820 and ports are as previously described with respect to FIG. 2.

FIG. 8 further includes feedback pathways 876*a*, 876*b* from directional couplers 860, 862 coupled between the diplexer first ports 818*a*, 820*a* and their respective first 802 and second 804 antenna. The forward control signals 874 control the value of the stabilization impedance 822 using information of the auxiliary forward/reverse power measurement receiver 811 so as to optimize the stabilization impedance 822 value. By example, the optimization criterion in one embodiment is to minimize reflected power from the antenna 802, 804 when the stabilization impedance 822 is altered. The stabilization impedance 822 is controlled from the baseband block 812, which in an embodiment combines the feedback 876*a*, 876*b* information collected at the auxiliary forward/reverse power measurement receiver 811, with other information such as that detailed above with respect to FIG. 7 (for example, receive and/or transmit operational frequency, interference situation of the radios, etc.) for controlling the impedance adjustment at 822.

FIG. 9 is a schematic diagram similar to portions of FIG. 1 showing a seventh example embodiment of the invention, in which the impedance stabilization circuitry 922 is interfaced to the second antenna 904 through a directional coupler 962 rather than through a diplexer. The directional coupler has a minimum of three ports also: a first port 962*a* interfaces to the second antenna 904; a second port 962*b* interfaces to the impedance stabilization circuitry 922 and ground 924; and the third port 962c interfaces to the RF front end 906. As previously described for the diplexer, assuming the second radio which interfaces to the second antenna 904 is a lower frequency band than a first radio which interfaces to the first antenna 902, then the third port 962c of the directional coupler 962 represents the low pass branch and the second port 962b represents the high pass branch. Signals from the active first antenna 902 are terminated at the ground 924 after being ported through the second port 962b of the directional coupler 962, and so the first antenna 902 and first radio see a stable impedance from the second antenna 904 and related circuitry.

FIG. 10 is a schematic diagram showing an eighth example embodiment of the invention in which the impedance stabilization circuitry 1022a, 1022b is actively switched to couple to the inactive antenna 1002, 1004. The illustrated filters and switches are on the RF front end module and the impedance stabilization circuitry 1022a, 1022b are also disposed on the RF front end module 1006. FIG. 10 has the first antenna 1002 and the second antenna 1004 to the right of the drawing and circuitry to the left, but similarities to earlier drawings will become apparent. In other example embodiments the filters, switches and impedance stabilization circuitry may not be disposed in a module, and may be discrete or disposed in some other form of RF package.

In the FIG. 10 embodiment, the selective coupler interfacing the first antenna 1002 selectively with the impedance stabilization circuitry 1022a is a first switch 1018 rather than a diplexer. A first port or pole 1018a of the first switch 1018 interfaces to the first antenna 1002, while a second port or throw 1018b of the first switch 1018 interfaces to the impedance stabilization circuitry 1022a. The first radio circuitry is coupled in at a transmit high band terminal 1080a which interfaces to any of the third through the sixth other throws 1018c-1, 1018c-2, 1018c-3 and 1018c-4 of the first switch 1018 (and also through the first back-end switch 1019 as illustrated).

A second switch 1020 coupled to the second antenna 1004 is arranged similarly. A first port or pole 1020a of the second switch 1020 interfaces to the second antenna 1004; a second port or throw 1020b of the second switch 1020 interfaces to the impedance stabilization circuitry 1022b; and the second radio circuitry is coupled in at a transmit low band terminal 1080b which interfaces to any of the third through the fifth other throws 1020c-1, 1020c-2 and 1020c-3 of the second switch 1020 through a second back-end switch 1021 as illustrated.

Various filters are for the different transmit and receive bands as indicated by example at FIG. 10. Dotted lines through the first/second switches 1018, 1020 indicate various switch positions, which would represent unwanted mutual coupling paths. Actual galvanic connection of the switching circuitry is shown in solid lines at FIG. 10. Specifically, in the example shown, the first antenna is active and coupled via the first switch 1018 (and the first back-end switch 1019) to transmit band I of the high band first radio. The second antenna 1004 is inactive and therefore is coupled via the second switch 1020 to the 50 ohm termination represented more generally as the stabilization impedance 1022b, blocking the impedance presented by the other path through the second switch 1020 which would otherwise be seen by the first antenna 1002 and high band first radio.

FIG. 11 is a schematic diagram similar to FIG. 10 showing a ninth example embodiment of the invention. This embodiment differs from that of FIG. 10 in that the impedance stabilization circuitry 1122a, 1122b is located off the RF front end module 1106. Additionally, each of those impedance stabilization circuits 1122a, 1122b are illustrated at FIG. 11 as being adjustable, which can be implemented for example by the control signals illustrated at any one of FIGS. 6-8.

In an example for FIG. 11, discrete components may be placed on the portable electronic device motherboard (or printed wiring board PWB) rather than on the RF front end 1106 component which is mounted to that motherboard. While the impedance is by example 50 ohms, any complex impedance may be implemented according to these teachings, and can be fixed value components or tunable value components, or alternatively there may be several selectable impedances which may be altered based on a control signal generated by a control logic or software or circuitry or a chipset or some combination of any of them.

FIG. 12 is a schematic diagram also similar to FIG. 10 and showing a tenth example embodiment of the invention, in which the (tunable) stabilization impedance interfaces to the first and second antennas 1202, 1204 via switches 1218, 1220 and a diplexer 1250. The selective couplers are implemented at FIG. 12 as switches 1218, 1220 similar to those described above for FIG. 10, but rather than the second port/throw 1218b, 1220b interfacing to the impedance stabilization circuitry directly, they each interface to a port 1250a, 1250a' of the diplexer 1250 which then couples to the variable impedance stabilization circuitry 1222 and ground 1224.

The second port/throw 1218b of the first switch 1218 interfaces to a first port 1250a of the diplexer 1250 which represents the high pass branch. The second port/throw 1220b of the second switch 1220 interfaces to a third port 1250a' of the diplexer 1250 which represents the low pass branch. The remaining second port 1250b of the diplexer then interfaces to the 50 ohm termination or impedance stabilization circuitry 1222 and ground 1224.

The arrangement of FIG. 12 allows both antennas 1202, 1204 to be interfaced to the same impedance stabilization circuitry 1222 via a single diplexer 1250. Either or both of the single diplexer 1250 and the stabilization impedance circuitry 1222 may be integrated onto the RF front end module 1206, or be implemented separate therefrom.

Figure 13:
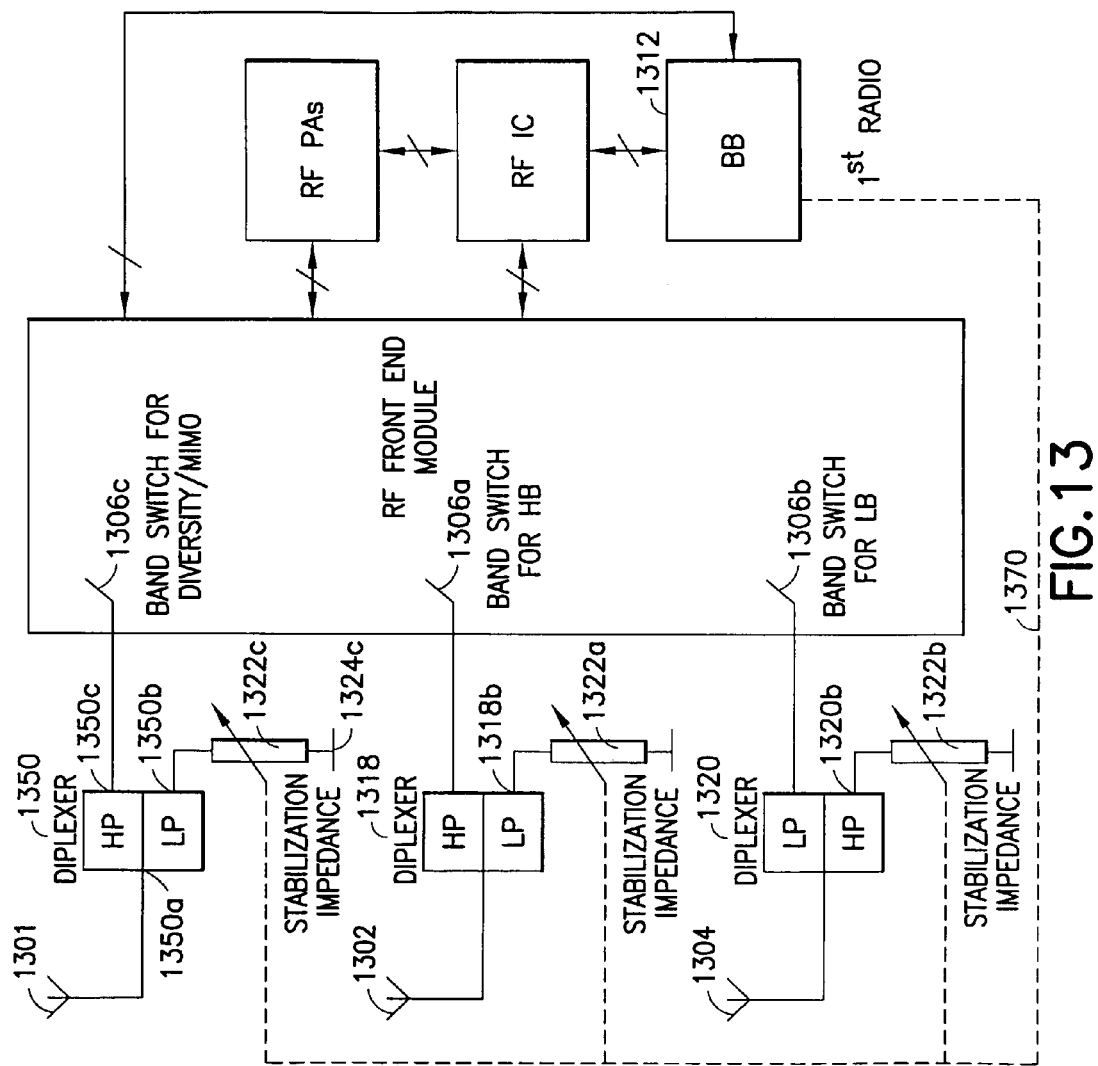
FIG. 13 is a schematic diagram similar to FIG. 6 showing an eleventh example embodiment of the invention in which the stabilization impedance is tunable by control signals from the baseband block.

FIG. 13 is a schematic diagram somewhat similar to FIG. 6 showing an eleventh example embodiment of the invention in which the third radio is integrated onto a RF front end chip (or module) 1306, and the stabilization impedance 1322a, 1322b, 1322c is tunable by control signals 1370 from the baseband block 1312. The arrangement of the first antenna 1302, first diplexer 1318, second antenna 1304 and second diplexer 1320 as well as the control signals 1370 is as described above with respect to FIG. 6.

FIG. 13 additionally has a third antenna 1301 which in this example, interfaces to a diversity or MIMO band switch 1306c on the RF front end module 1306 via a third diplexer 1350. A first port 1350a of the third diplexer 1350 interfaces to the third antenna 1301; a third port 1350c of the third diplexer 1350 interfaces to the diversity/MIMO radio switch 1306c; and a second port 1350b of the third diplexer 1350 interfaces to an impedance stabilization circuitry 1322c similar to those 1322a, 1322b interfaced by the first and second diplexers 1318, 1320.

As noted above with respect to FIG. 6, the stabilization impedances 1322a, 1322b, 1322c may be tunable, with tuning implemented by one or more of the following: a PIN-diode; a semiconductor (or transistor), a MEMS capacitor; a varactor; a tunable/switchable grounding; and a tunable-length strip line.

Also noted above, the stabilization impedance(s) 1322a, 1322b, 1322c may be controlled by the first, second or third radios or based on information from combinations of those radios. In a specific embodiment, the tuning criteria for when an adjustment to the stabilization impedance is or is not executed may be based on transmission and/or reception performance of any of the first, second or third radios. The switching module shown as the RF front end 1306 may have multiple connections to the various antennas 1302, 1304, 1301 (similar to those illustrated at FIGS. 10-12) and multiple connections to various radios (similar to those illustrated also at FIGS. 10-12).

In a particular implementation of FIG. 13 such as in a high speed packet access HSPA system or LTE, for the case of signal reception where diversity is used (switch 1306c is closed as diversity to the high band cellular radio interfaced at switch 1306a for example), the first reception of the signal (for example, at the first antenna 1302) is in a first frequency band and the second reception of the signal (for example, at the diversity antenna 1301) is in a second frequency band.

Figure 14:
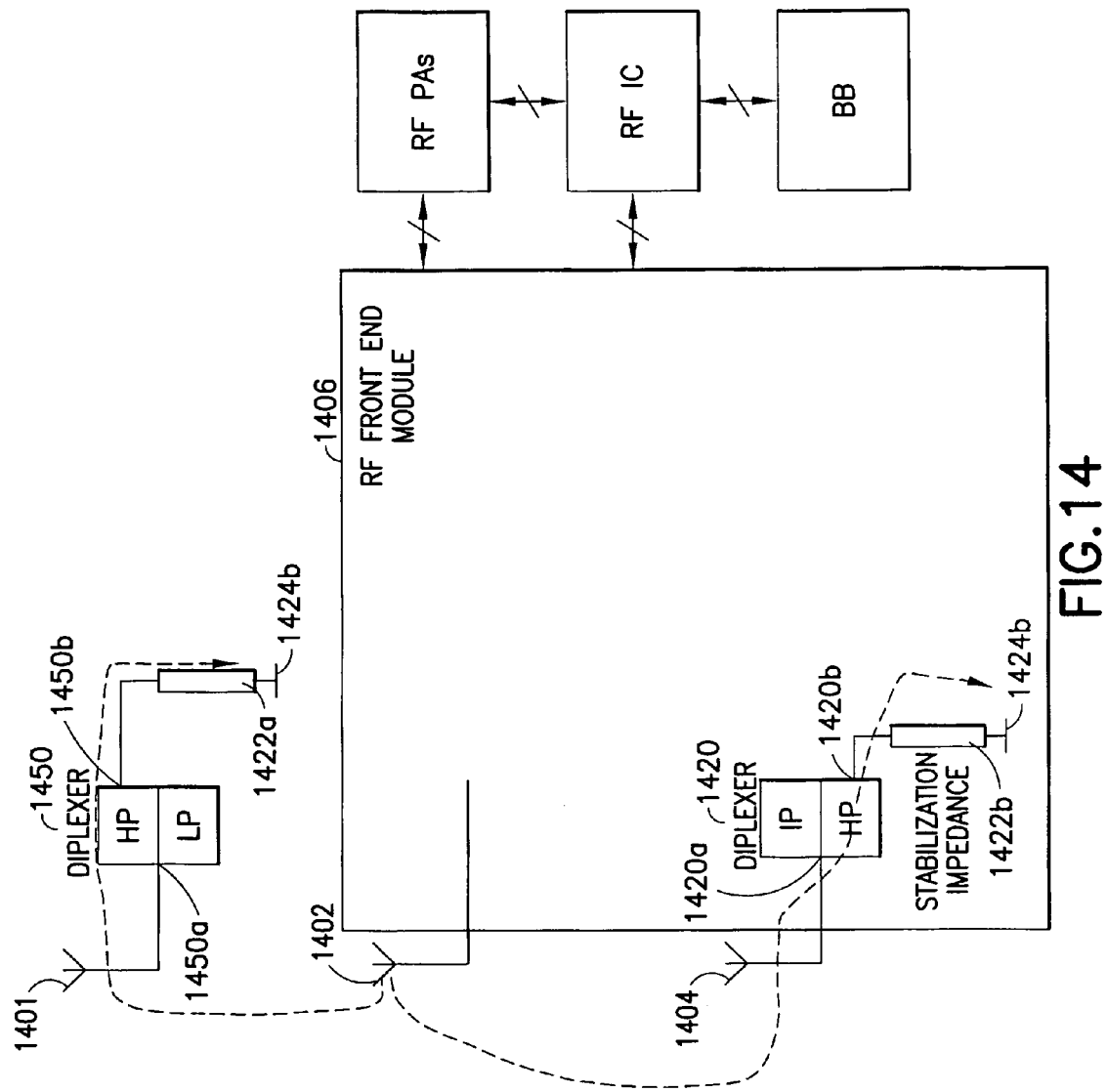
FIG. 14 is a schematic diagram similar in part to FIG. 5 and showing a twelfth example embodiment of the invention in which the stabilization impedance is at a third antenna which in a particular but non-limiting implementation has no operable connection to any radio.

FIG. 14 is a schematic diagram similar in part to FIG. 5 and showing a twelfth example embodiment of the invention in which the stabilization impedance 1422a is at a third antenna 1401 which as particularly illustrated at FIG. 14 has no operable connection to any radio. Specifically, in this example the first antenna 1402 is active and the second antenna 1402 and the third antenna 1401 are inactive. The impedance seen by the first antenna 1402 in the direction of the second antenna 1404 is the stabilization impedance 1422b (which is coupled to ground 1424b) coupled through the high pass branch (first port 1420a to second port 1420b) of the second diplexer 1420. Similarly, the impedance seen by the first antenna 1402 in the direction of the third antenna 1401 is the stabilization impedance 1422a (which is coupled to ground 1424b) coupled through the high pass branch (first port 1450a to second port 1450b) of the third diplexer 1450. In this example, the third antenna 1401 is a dedicated resonator for antenna impedance, without a connection to any radio. FIG. 14 illustrates both the third antenna 1401 and the second antenna 1402 without radio connection simply to illustrate that the diplexers 1420, 1450 which interface the dedicated resonator/antenna to the stabilization impedance may be disposed on the RF front end chip (or module) 1402 as shown by the second antenna 1404, or external to the chip (or module) 1406 as shown by the third antenna 1401. Not shown at FIG. 14 but assumed is a radio that interfaces to whichever of the first antenna 1402 or second antenna 1404 that is not the dedicated resonator (which is the third antenna 1401 in FIG. 14).

Figure 15:
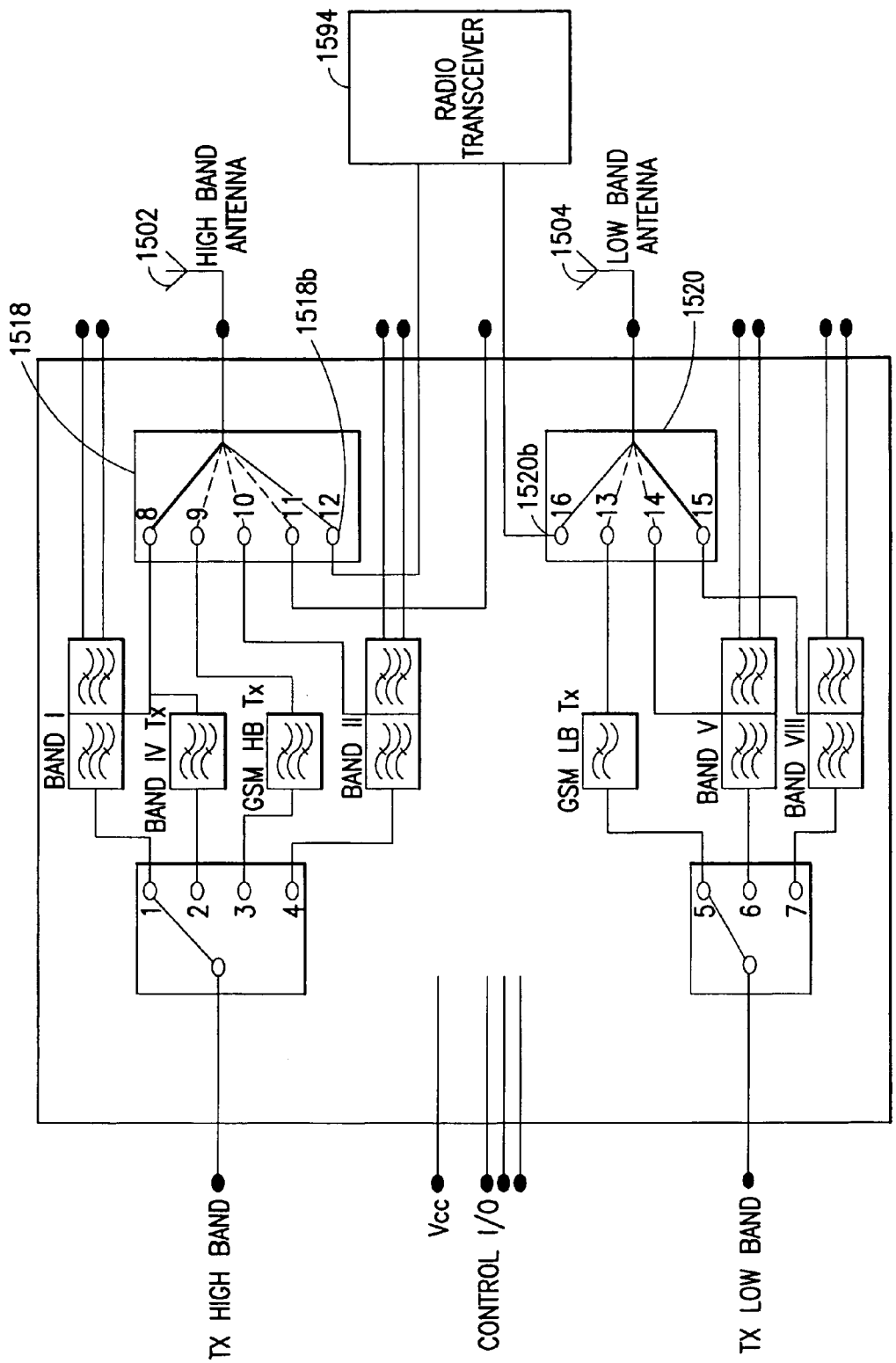
FIG. 15 is a schematic diagram somewhat similar to FIGS. 5 and 10 and showing a thirteenth example embodiment of the invention in which the stabilization impedance is at a third radio that interfaces to both first and second antennas.

FIG. 15 is a schematic diagram combining aspects of FIGS. 5 and 10, and showing a thirteenth example embodiment of the invention in which the stabilization impedance is at a third radio 1594 that interfaces to both the first antenna 1502 and second antenna 1504. Specifically, the first antenna 1502 interfaces via a second port/throw 1518b of a first switch 1518 or selective coupler to a third radio 1594 which may be grounded and which acts as a stabilization impedance to the second antenna 1504 in the direction of the first antenna 1502 when the second antenna 1504 is active. And similarly, the second antenna 1504 interfaces via a second port/throw 1520b of a second switch 1520 or selective coupler to the grounded third radio 1594 which acts as a stabilization impedance to the first antenna 1502 in the direction of the second antenna 1504 when the first antenna 1502 is active. While only one third radio 1594 is shown at FIG. 15, there may be separate radios coupled to the second ports 1518b, 1520b of the respective first 1518 and second 1520 selective couplers.

Figure 16:
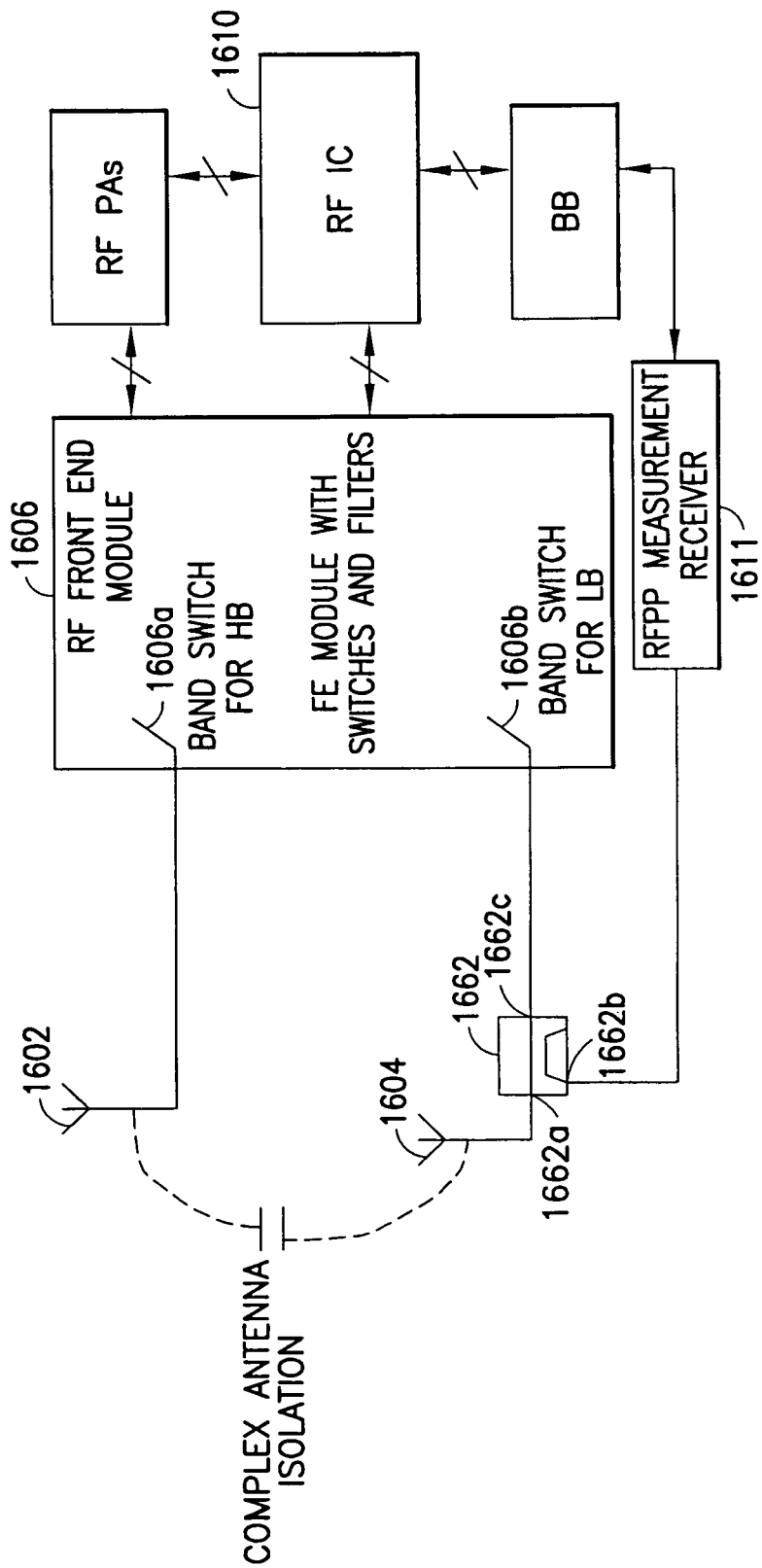
FIG. 16 is a schematic diagram somewhat similar to FIG. 8 and showing a fourteenth example embodiment of the invention in which the stabilization impedance is at the power/phase measurement receiver.

FIG. 16 is a schematic diagram somewhat similar to FIG. 8 and showing a fourteenth example embodiment of the invention in which the stabilization impedance is at the power/phase measurement receiver (RFPP Measurement Receiver) 1611. Not shown at FIG. 16 but understood from FIG. 8 is that there are feedback signal lines and control signal lines between the FRPP receiver 1611 and the antennas 1602, 1604. In the embodiment of FIG. 16 it is the RFPP receiver 1611 itself which operates as the impedance stabilization circuit, and like all other radios it too is grounded so the impedance stabilization is to ground as previously described. FIG. 16 illustrates that the second antenna 1604 is coupled to the RFPP measurement receiver 1611 via a high pass branch (first port 1662a to second port 1662b) of a directional coupler 1662, though the coupling may also be via a diplexer or it may be a capacitive coupling instead. The low pass branch of the directional coupler 1662 goes between the first port 1662a and a third port 1662c which interfaces to a low band radio, different from a frequency band for the high band radio which interfaces via a high band switch 1606a to the first antenna 1602. The RFPP measurement radio 1611 may be disposed on the RF front end chip (or module) 1606, on the RF integrated circuit chip (or module) 1610, or separate from them both as illustrated.

While the specific examples detailed above are in the context of one antenna being active and the other, proximally disposed antenna being inactive, advantages of the invention may also be achieved when both antennas are active. For example, where there is a cellular and a diversity or complementary radio interfaced to the two antennas in question, both may be active simultaneously in different radio frequency bands, and embodiments of the invention can isolate them from one another.

Figure 17:
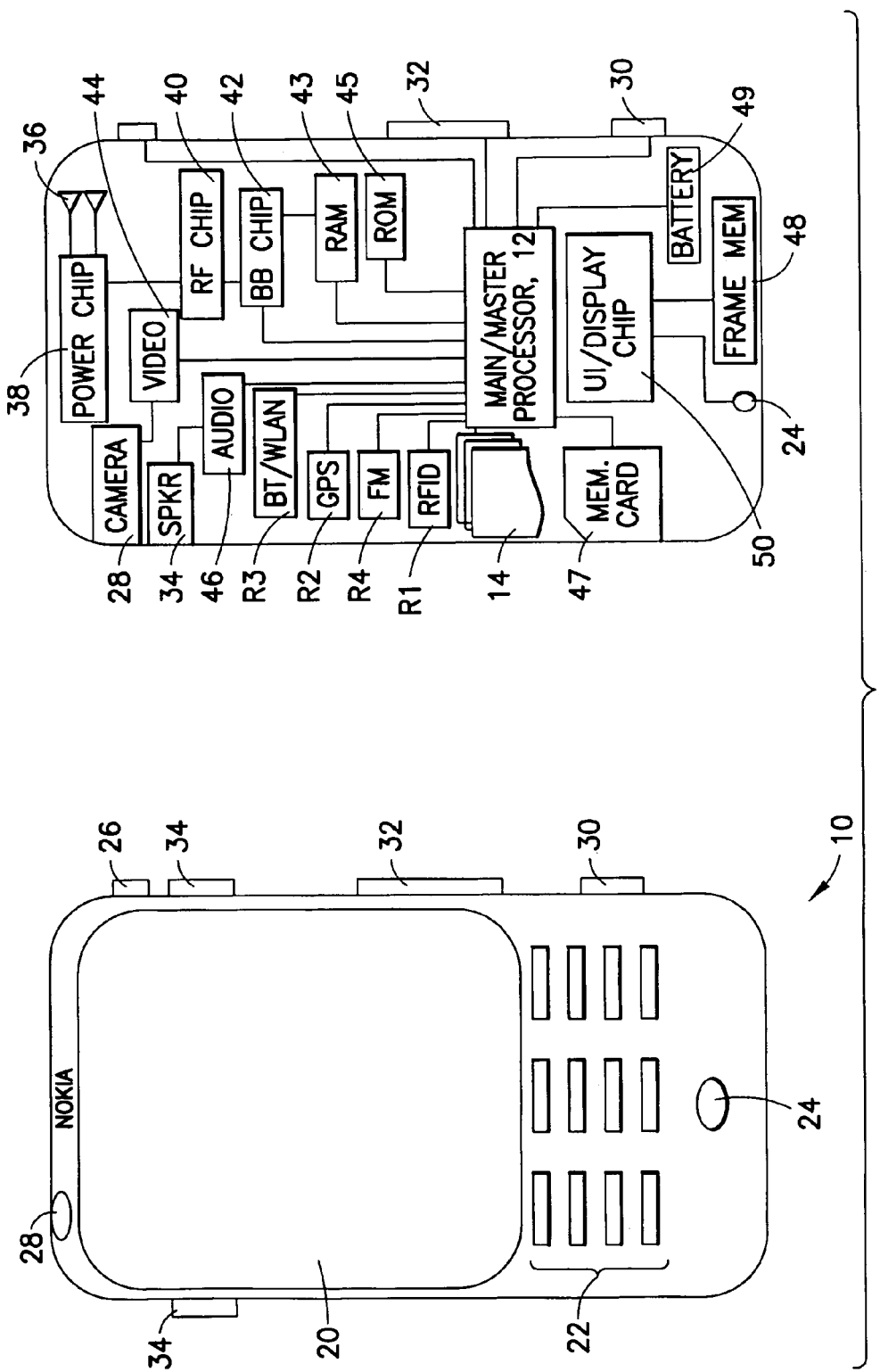
FIG. 17 is a schematic diagram in plan view (left) and sectional view (right) of a mobile terminal handset which is an example of a host device in which various embodiments of the invention may be disposed.

Antennas and one or more selective couplers to impedance stabilization circuitry according to the example embodiments may be disposed in a portable electronic device or mobile station such as the one shown at FIG. 17, also termed a user equipment (UE) 10. In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Without loss of generality, embodiments of the invention can also be disposed in network elements that are not mobile handheld user equipments.

There are several computer readable memories 14, 43, 45, 47, 48 illustrated in FIG. 17, which may be of any type suitable to the local technical environment and may be implemented using any suitable data storage technology, such as semiconductor based memory devices, flash memory, magnetic memory devices and systems, optical memory devices and systems, fixed memory and removable memory. There is also shown a main or digital processor 12 which may be of any type suitable to the local technical environment, and may include one or more of general purpose computers, special purpose computers, microprocessors, digital signal processors (DSPs) and processors based on a multicore processor architecture, as non-limiting examples.

Further detail of an example UE, shown in both plan view (left) and sectional view (right) at FIG. 17, are given for completeness. The UE 10 has a graphical display interface 20 and a user input interface 22 illustrated as a keypad but understood as also encompassing touch-screen technology at the graphical display interface 20 and voice-recognition technology received at the microphone 24. A power actuator 26 controls the device being turned on and off by the user. The example UE 10 may have a camera 28 which may be either or both of forward or rear facing, and controlled by a shutter actuator 30 and optionally also a zoom actuator 32 which may alternatively function as a volume adjustment for the speaker (s) 34 when the camera 28 is not in an active mode.

Within the sectional view of FIG. 17 are seen multiple transmit/receive antennas 36 which may be in the position of any of the first/second/third antennas detailed in the various embodiments above. These antennas 36 may be multi-band or single band antennas, and may be physically disposed anywhere within the UE 10.

There may be secondary radios (Bluetooth/WLAN shown together as R3, RFID shown as R1, GPS shown as R2, and FM shown as R4) may use some or all of the processing functionality of the RF chip 40, and/or the baseband chip 42. Due to the crowded diagram, ports, circuitry, and filters are not illustrated at FIG. 17, but are shown in the example embodiments at FIGS. 1-16 and can be physically disposed at various locations within the overall UE 10.

The UE 10 may also include an image/video processor 44 and/or a separate audio processor 46 controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Throughout the apparatus are various memories such as random access memory RAM 43, read only memory ROM 45, and in some embodiments removable memory such as the illustrated memory card 47 on which various programs of computer readable instructions are stored. Such stored software programs may for example set values for the variable stabilization impedances for given operational states or feedback information, as detailed in various embodiments above, which may be in correspondence with transmit and/or receive schedules of the various radios. All of these components within the UE 10 are normally powered by a portable power supply such as a battery 49 or with a conductive power supply such as a charger.

The aforesaid chips 38, 40, 42, 44, 46, 50, if embodied as separate entities in a UE 10 which may each be considered a different processor, may operate in a slave relationship to the main processor 12, which may then be in a master relationship to them. Any or all of these various processors of FIG. 17 access one or more of the various memories, which may be on-chip with the processor or separate therefrom.

Note that the various chips (for example, 38, 40, 42, etc.) that were described above may be combined into a fewer number than described and, in a most compact case, may all be embodied physically within a single chip. Reference to any of those processors as chips does not imply a particular physical embodiment; any or all of them may be embodied as an integrated circuit (IC), a component thereof, an arrangement of circuitry, and the like.

Figure 18:
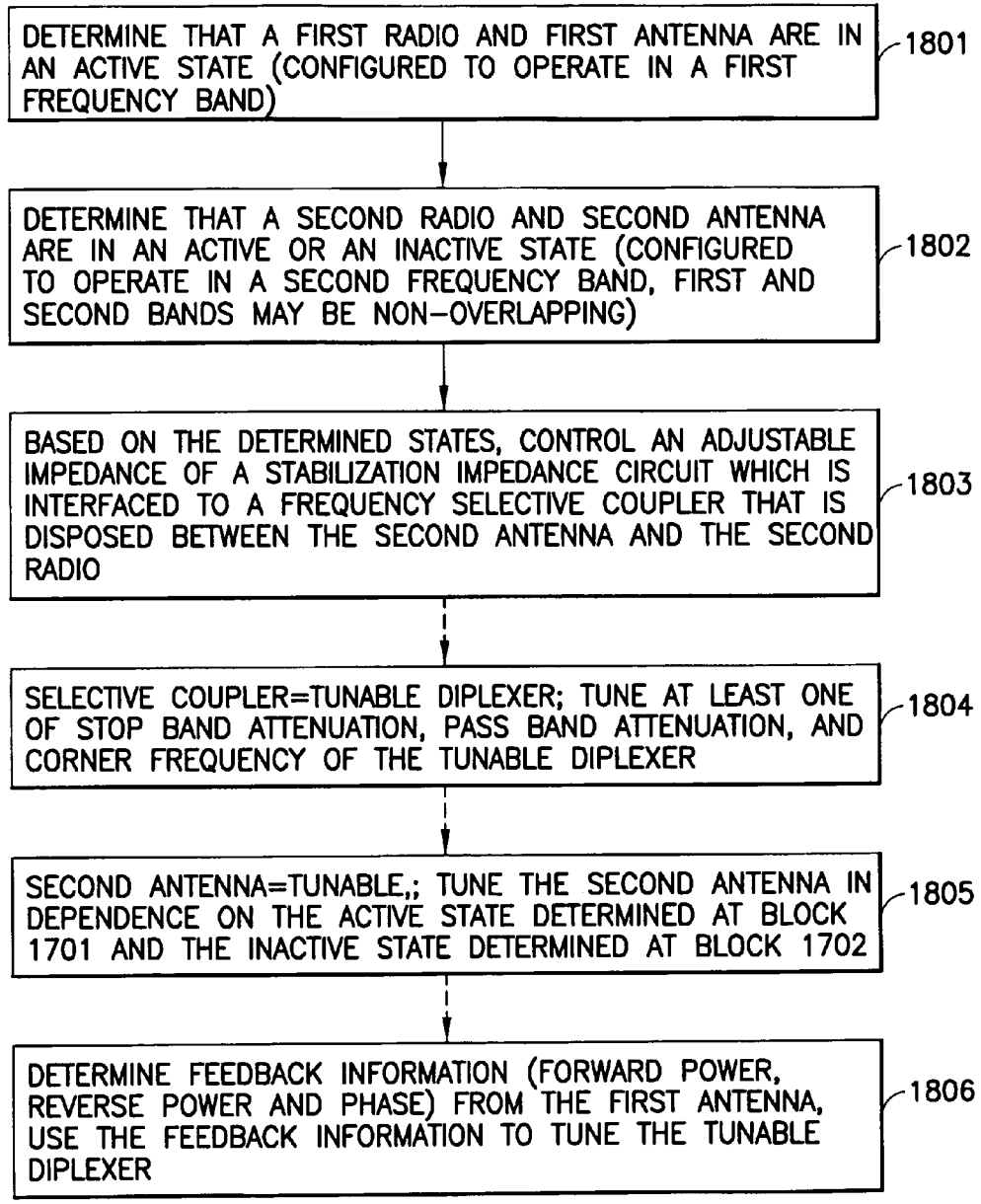
FIG. 18 is a logic flow diagram that illustrates the operation of a method, and a result of execution of computer program instructions embodied on a computer readable memory, in accordance with certain example embodiments of the invention.

FIG. 18 is a logic flow diagram that illustrates an example of an operation of a method for stabilizing impedance of a second antenna seen by a first antenna. At block 1801 it may be determined that a first radio and first antenna, which are configured to operate in a first frequency band, are in an active state. At block 1802 it may be determined that a second radio and second antenna are in an active or an inactive state, in which the second radio and second antenna are configured to operate in a second frequency band which may or may not be non-overlapping with the first frequency band. At block 1803, based on the active/inactive states determined at blocks 1801-1802, an adjustable impedance of a stabilization impedance circuit may be controlled, in which the stabilization impedance circuit may be interfaced to a frequency selective coupler (for example, a diplexer as in FIGS. 1-8, or a directional coupler as in FIG. 9, or a frequency controlled switch as in FIGS. 10-12) that may be disposed between the second antenna and the second radio.

Optionally at FIG. 18 there is block 1804, which may be contingent on the frequency selective coupler being or comprising a tunable diplexer. At block 1804 there may be tuning of at least one of stop band attenuation, pass band attenuation, and corner frequency of the tunable diplexer based on the active state determined at block 1801 and the inactive state determined at block 1802.

Optionally at FIG. 18 there may be block 1805, which may be combined with optional block 1804 or simply combined with blocks 1801-1803. At block 1805 the second antenna may be tunable, and the method further includes tuning the second antenna in dependence on the active state determined at block 1801 and the active or inactive state determined at block 1802. The antenna may be tuned using at least one of: receive operational frequency; transmit operational frequency; interference scenario/situation of two or more radios; receive signal level; transmit signal level; transmit activity; receive activity, number of sub-carriers in a transmitted or received signal, modulation of a transmitted or received signal, a functional form of a host device (for example, open or closed configuration), antenna covering by an external object, power of a forward fundamental signal, power of a reflected fundamental signal, voltage standing wave ratio VSWR, ALCR (adjacent leakage channel ratio) power of a forward signal, ALCR power of a reflected signal, power of a harmonic signal, power of ACLR of a harmonic signal, and antenna impedance loading condition.

Optionally at FIG. 18 there may be also block 1806, which may be combined with optional block 1804 with or without optional block 1805. At block 1806 there may be determined feedback information from the first antenna, the feedback information comprising of at least one of forward power, reverse power and phase. This feedback information may be used at least in part to tune the diplexer at block 1804 and/or the antenna at block 1805 and/or the impedance stabilization circuitry itself.

The various blocks shown in FIG. 18 may be viewed as but one example embodiment of a method, and/or as operations that result from operation of computer program code/instructions stored on a computer readable memory such as those shown at FIG. 17, and/or as a plurality of coupled logic circuit elements (for example, disposed on an integrated circuit chip) constructed to carry out the associated function(s). It should be appreciated that although the blocks shown in FIG. 18 are in a specific order that this order may be carried out in any order or even some of the blocks may be omitted as required.

Certain exemplary embodiments of the invention provide the following technical aspects. If the low pass filter phase response is designed according to antenna resonance impedance, a separate external phase shifter component need not be included. As to mutual coupling; the active first antenna may not see the second antenna front end impedances, since the second antenna impedance is stabilized with the coupler/diplexer structure where the first antenna's operational frequency is terminated with optimal impedance. This optimal impedance can be altered based on activity of the first and second antennas and first and second radios. The termination or stabilization impedance may be selected so that mutual coupling between antennas is minimized. The diplexer corner frequency may be selected to fall between the first and second frequency bands (the operational frequencies of the first and second antennas/radios).

In further technical aspects, certain embodiments of the invention allow for the elimination of a GSM low pass filter since it would be redundant. The diplexer corner frequency may be selected according to active transmission interference frequencies, and the transmission interference may be wide band noise, harmonic, and/or adjacent channel leakage ACLR. Since the coupler/diplexer acts as an extra pre-filter for the receiver, out-of-band blocking performance of the receiver can be improved against internal/external interferences. The second radio stabilization impedance can be phase optimized with information described above as being accumulated at the forward/reverse/phase receiver. Optimization criteria can be set to minimize reflected power from the antenna when the termination or stabilization impedance is altered, and so no additional controls are needed and no additional switches are needed for the embodiments of FIGS. 2-6 at least. And finally, the filtering attenuation requirements of WCDMA duplexers can be relaxed since the transmit/receive signal may be conveyed via an extra diplexer filter(s).

In general, the various example embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the example embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the example embodiments of the inventions may be practiced in various components such as integrated circuit chips and modules, and that the example embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the example embodiments of this invention. For embodiments in which there is no processor controlling tunable or adjustable elements, embodiments of the invention may be still implemented as one or more integrated circuit chips (for example, the RF front end modules illustrated) with the described first and second antennas and interfaces/radio switches to the described first and second radios (and third antennas/radios in those further embodiments).

Various modifications and adaptations to the foregoing example embodiments of this invention may become apparent to those skilled in the relevant arts in view of the foregoing description, when read in conjunction with the accompanying drawings, without departing from these teachings.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof.

As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and example embodiments of this invention may be used to advantage without the corresponding use of other features. As such, the foregoing description should be considered as merely illustrative of the principles, teachings and example embodiments of this invention, and not in limitation thereof.

We claim:

1. An apparatus comprising:
   a first antenna configured to resonate within a first frequency band;
   a second antenna disposed proximal to the first antenna and configured to resonate in a second frequency band;
   impedance stabilization circuitry configurable to stabilize the impedance seen by the first antenna in the direction of the second antenna; and
   a selective coupler configured to couple to the second antenna selectively with the impedance stabilization circuitry and with radio circuitry, the selective coupler comprising a first port configured to couple to the second antenna, a second port configured to couple to the impedance stabilization circuitry, and a third port configured to couple with radio circuitry, the radio circuitry configured to operate in the second frequency band; the selective coupler configured to provide a predetermined impedance via the impedance stabilization circuitry to signals within the first frequency band and to provide a low insertion loss to signals within the second frequency band.

2. The apparatus according to claim 1, wherein the selective coupler comprises a second diplexer, the impedance stabilization circuitry is a second impedance stabilization circuitry, and the radio circuitry comprises a second radio; the apparatus further comprising:
   a first diplexer configured to couple to the first antenna selectively with a first impedance stabilization circuitry and with a first radio, the first diplexer comprising a first port configured to couple to the first antenna, a second port configured to couple to the first impedance stabilization circuitry , and a third port configured to couple with the first radio, the first radio configured to operate in the first frequency band; the first diplexer configured to provide a low insertion loss to signals within the first frequency band and to provide a predetermined impedance to signals within the second frequency band.

3. The apparatus according to claim 1, further comprising a third diplexer disposed between the selective coupler and the second antenna;
   wherein a first port of the third diplexer is configured to couple to the second antenna, a second port of the third diplexer is configured to couple to a termination impedance, and a third port of the third diplexer is configured to couple to the first port of the selective coupler.

4. The apparatus according to claim 1, further comprising:
   an antenna diplexer disposed between the selective coupler and the second antenna, the antenna diplexer comprising a first port configured to couple to the second antenna, a low pass second port configured to couple to the first port of the selective coupler, and a high pass third port configured to couple to the first port of the selective coupler; and a third diplexer having a first port configured to couple to the low pass second port of the antenna diplexer, a high pass second port configured to couple to a second impedance stabilization circuitry, and a low pass third port configured to couple with a third radio, the third radio configured to operate in a frequency band lower than the first and the second frequency bands.

5. The apparatus according to claim 2, wherein the second impedance stabilization circuitry comprises a third radio circuitry configured to operate in a frequency band lower than the second frequency band.

6. The apparatus according to claim 2, wherein at least one of the first and second impedance stabilization circuitry is dynamically tunable, the apparatus further comprising a control signal line from at least one processor configured to adjust impedance of the said at least one impedance stabilization circuitry based on at least one of a transmission and a reception performance parameter of at least one radio.

7. The apparatus according to claim 6, wherein at least one of the first and second diplexers is tunable;
and wherein the control signal line is configured to tune at least one of stop band attenuation, pass band attenuation, and corner frequency of the at least one tunable diplexer.

8. The apparatus according to claim 7, wherein at least one of the first and second antennas are tunable;
and wherein the control signal line is configured to tune at least one of the tunable antenna and the tunable second stabilization impedance based on at least one of: receive operational frequency; transmit operational frequency; interference situation of two or more radios; receive signal level; transmit signal level; transmit activity; receive activity, number of sub-carriers in a transmitted or received signal, modulation of a transmitted or received signal, and antenna impedance loading condition.

9. The apparatus according to claim 6, further comprising at least one feedback line carrying information of at least one of forward power, reverse power and phase from the first antenna;
wherein the control signal line from at least one processor is configured to adjust impedance of the second impedance stabilization circuitry based on at least in part on the information carried on the feedback line.

10. The apparatus according to claim 1, wherein the selective coupler comprises a directional coupler.

11. The apparatus according to claim 1, wherein the selective coupler comprises a switch configured to selectively couple the second antenna to the impedance stabilization circuitry when the radio circuitry is inactive and when the first antenna is active.

12. The apparatus according to claim 11, wherein the switch comprises a second switch, the impedance stabilization circuitry is a second impedance stabilization circuitry, and the radio circuitry comprises a second radio; the apparatus further comprising:
a first switch configured to couple the first antenna selectively with a first impedance stabilization circuitry and with a first radio, the first switch comprising a first port configured to couple to the first antenna, a second port configured to couple to the first impedance stabilization circuitry, and a third port configured to couple with the first radio, the first radio configured to operate in the first frequency band;
a first series of band-specific filters configured to selectively couple to the first antenna by the first switch; and
a second series of band selectable filters configured to selectively couple to the second antenna by the second switch.

13. The apparatus according to claim 11, wherein at least one of the first and second impedance stabilization circuitry is configured to dynamically tune the impedance of the at least one of the first and second impedance stabilization circuitry based on at least one of a transmission and a reception performance parameter of at least one radio.

14. The apparatus according to claim 11, wherein the switch comprises a second switch, the impedance stabilization circuitry is a diplexer, and the radio circuitry comprises a second radio; the apparatus further comprising:
a first switch configured to couple the first antenna selectively with the impedance stabilization circuitry and with a first radio, the first switch comprising a first port configured to couple to the first antenna, a second port configured to couple to the impedance stabilization circuitry, and a third port configured to couple with the first radio, the first radio configured to operate in the first frequency band; and
a diplexer configured to couple the impedance stabilization circuitry via a high pass port to the second port of the first switch and the impedance stabilization circuitry via a low pass port to the second port of the second switch.

15. A portable electronic device, comprising:
a first antenna configured to resonate within a first frequency band;
a second antenna disposed proximal to the first antenna and configured to resonate in a second frequency band;
impedance stabilization circuitry configurable to stabilize the impedance seen by the first antenna in the direction of the second antenna; and
a selective coupler configured to couple to the second antenna selectively with the impedance stabilization circuitry and with radio circuitry, the selective coupler comprising a first port configured to couple to the second antenna, a second port configured to couple to the impedance stabilization circuitry, and a third port configured to couple with radio circuitry, the radio circuitry configured to operate in the second frequency band; the selective coupler configured to provide a predetermined impedance via the impedance stabilization circuitry to signals within the first frequency band and to provide a low insertion loss to signals within the second frequency band.

16. The portable electronic device according to claim 15, wherein the selective coupler comprises a second diplexer, the impedance stabilization circuitry is a second impedance stabilization circuitry, and the radio circuitry comprises a second radio; the apparatus further comprising:
a first diplexer configured to couple to the first antenna selectively with a first impedance stabilization circuitry and with a first radio, the first diplexer comprising a first port configured to couple to the first antenna, a second port configured to couple to the first impedance stabilization circuitry, and a third port configured to couple with the first radio, the first radio configured to operate in the first frequency band; the first diplexer configured to provide a low insertion loss to signals within the first frequency band and to provide a predetermined impedance to signals within the second frequency band.

17. The portable electronic device according to claim 15, further comprising a third diplexer disposed between the selective coupler and the second antenna;
wherein a first port of the third diplexer is configured to couple to the second antenna, a second port of the third diplexer is configured to couple to a termination impedance, and a third port of the third diplexer is configured to couple to the first port of the selective coupler.

18. The portable electronic device according to claim 15, further comprising:

an antenna diplexer disposed between the selective coupler and the second antenna, the antenna diplexer comprising a first port configured to couple to the second antenna, a low pass second port configured to couple to the first port of the selective coupler, and a high pass third port configured to couple to the first port of the selective coupler; and a third diplexer having a first port configured to couple to the low pass second port of the antenna diplexer, a high pass second port configured to couple to a second impedance stabilization circuitry, and a low pass third port configured to couple with a third radio, the third radio configured to operate in a frequency band lower than the first and the second frequency bands.

19. The portable electronic device according to claim 16, wherein the second impedance stabilization circuitry comprises a third radio circuitry configured to operate in a frequency band lower than the second frequency band.

20. The portable electronic device according to claim 16, wherein at least one of the first and second impedance stabilization circuitry is dynamically tunable, the apparatus further comprising a control signal line from at least one processor configured to adjust impedance of the said at least one impedance stabilization circuitry based on at least one of a transmission and a reception performance parameter of at least one radio.

* * * * *